US011392279B2

(12) United States Patent
Campbell et al.

(10) Patent No.: US 11,392,279 B2
(45) Date of Patent: Jul. 19, 2022

(54) INTEGRATION OF PERSONALIZED DYNAMIC WEB FEED EXPERIENCES INTO OPERATING SYSTEM SHELL SURFACES

(71) Applicant: Microsoft Technology Licensing, LLC, Redmond, WA (US)

(72) Inventors: Alexander Leo Campbell, Seattle, WA (US); Shengbo Xue, Kirkland, WA (US); Dena Natalie Saunders, Sammamish, WA (US); Robert David Frye, Seattle, WA (US); Julian Manuel Varanda, Seattle, WA (US); Bradford Glenn Singley, Renton, WA (US); Camille Dominique Basilio, Kirkland, WA (US); Hanna McLaughlin, Seattle, WA (US); Dorothy Feng, Seattle, WA (US); Arthur Chen, Bellevue, WA (US); Guillermo Enrique Rueda, Seattle, WA (US); Chani Ayn Doggett, Issaquah, WA (US); Nassim Amar, Bothell, WA (US); Bojun Ma, Issaquah, WA (US); Houman Motevaselolhagh, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 3 days.

(21) Appl. No.: 17/148,912

(22) Filed: Jan. 14, 2021

(65) Prior Publication Data

US 2022/0155924 A1 May 19, 2022

Related U.S. Application Data

(60) Provisional application No. 63/114,406, filed on Nov. 16, 2020.

(51) Int. Cl.
*G06F 3/0484* (2022.01)
*H04L 67/02* (2022.01)
(Continued)

(52) U.S. Cl.
CPC ............ *G06F 3/0484* (2013.01); *G06F 9/451* (2018.02); *H04L 67/02* (2013.01); *G06F 40/20* (2020.01); *G06N 20/00* (2019.01)

(58) Field of Classification Search
None
See application file for complete search history.

(56) References Cited

U.S. PATENT DOCUMENTS 7,370,277 B1 * 5/2008 Canfield ................. H04L 51/04
715/752
7,793,227 B2 * 9/2010 Wada ..................... G06F 3/0482
715/767

(Continued)

FOREIGN PATENT DOCUMENTS

EP 2980690 A1 * 2/2016 ........... G06F 3/0481

OTHER PUBLICATIONS

Lua, "How to Customize Your Facebook News Feed to Maximize Your Productivity," Feb. 12, 2019, https://web.archive.org/web/20190212174136/https://buffer.com/library/customize-my-news-feed/.*

*Primary Examiner* — Ryan Barrett

(57) ABSTRACT

Systems, methods and devices for surfacing web content in an operating system shell construct are provided. A taskbar web content element size may be selected based on an amount of free space in a taskbar. First and second scored web content may be received, wherein the web content is scored based at least on the web content's relevance score to a first user account. A taskbar web content topical display category corresponding to the first web content may be selected based on the first web content having a higher score (Continued)

than the second web content. A web content element of the selected size and topical display category may be caused to be surfaced in the taskbar. A selection of the surfaced web content element may be received and a subset of the first web content form the first source may be caused to be surfaced in a web content pane.

20 Claims, 17 Drawing Sheets

(51) Int. Cl.
*G06F 9/451* (2018.01)
*G06F 40/20* (2020.01)
*G06N 20/00* (2019.01)

(56) References Cited

U.S. PATENT DOCUMENTS

| | | | |
|---|---|---|---|
| 9,710,133 B2* | 7/2017 | Matthews | G06F 3/0481 |
| 10,318,338 B2* | 6/2019 | DeLuca | G06F 9/48 |
| 10,386,992 B2* | 8/2019 | Shin | H04L 65/403 |
| 10,489,013 B2* | 11/2019 | Chen | G06F 3/0482 |
| 2002/0163545 A1* | 11/2002 | Hii | G06F 3/0483 |
| | | | 715/838 |
| 2004/0268261 A1* | 12/2004 | Elliott | G06F 3/0488 |
| 2007/0157105 A1* | 7/2007 | Owens | H04L 67/02 |
| | | | 715/779 |
| 2007/0157107 A1* | 7/2007 | Bishop | H04L 67/02 |
| | | | 715/779 |
| 2007/0214431 A1* | 9/2007 | Amadio | G06F 9/451 |
| | | | 715/788 |
| 2008/0243827 A1* | 10/2008 | Sarma | G06F 16/24575 |
| | | | 707/999.005 |
| 2013/0073995 A1* | 3/2013 | Piantino | G06Q 50/01 |
| | | | 715/764 |
| 2013/0212091 A1* | 8/2013 | Hoffman | G06F 16/951 |
| | | | 707/769 |
| 2013/0227470 A1* | 8/2013 | Thorsander | G06F 3/0482 |
| | | | 715/790 |
| 2014/0325431 A1* | 10/2014 | Vranjes | G06F 9/542 |
| | | | 715/788 |
| 2015/0261392 A1* | 9/2015 | Son | G06F 9/451 |
| | | | 715/779 |
| 2015/0356183 A1* | 12/2015 | Green | G06F 16/9535 |
| | | | 707/724 |
| 2016/0026920 A1* | 1/2016 | Sullivan | G06F 16/48 |
| | | | 706/11 |
| 2016/0239157 A1* | 8/2016 | Oliver | G06F 11/3476 |
| 2018/0173725 A1* | 6/2018 | De Guerre | G06F 16/5866 |
| 2018/0322205 A1* | 11/2018 | Balaraman | G06F 16/9558 |
| 2018/0335939 A1* | 11/2018 | Karunamuni | G06F 3/04883 |
| 2019/0205929 A1* | 7/2019 | Snibbe | G06Q 30/0277 |
| 2021/0125584 A1* | 4/2021 | Hitzler | G06F 3/147 |
| 2021/0344779 A1* | 11/2021 | Borza | H04L 67/42 |

* cited by examiner

FIG. 4

INTEGRATION OF PERSONALIZED DYNAMIC WEB FEED EXPERIENCES INTO OPERATING SYSTEM SHELL SURFACES

RELATED APPLICATIONS

This application is related to and claims priority to U.S. Provisional Patent Application No. 63/114,406, filed Nov. 16, 2020, and entitled "Integration of Personalized Dynamic Web Feed Experiences Into Operating System Shell Surfaces," which is hereby incorporated by reference in its entirety.

BACKGROUND

Users typically have two or more computing devices at their fingertips (e.g., desktop device, smart phone, tablet) during a typical workday. With constant notifications and alerts coming in on the secondary devices (e.g., the smart phones and tablets) there is a cognitive burden associated with switching back and forth amongst the computing devices and their different contexts. This cognitive burden makes it difficult to stay on track and maintain productivity.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for surfacing web content in operating system shell constructs. Web content may be identified and scored based on its relevance to a user (e.g., preferences and settings associated with a user account). If web content is determined to meet a threshold relevance score to a user, a web content element including a portion of that web content, or information derived from that web content, may be surfaced in a taskbar web content element. The taskbar web content element may remain present and include baseline web content or rotational web content. The taskbar web content element may be sized based on the amount of free space in the taskbar. If an interaction is received at the taskbar web content element a flyout web content pane that includes additional information corresponding to the web content may be surfaced. The web content pane may include other web content that has been determined to meet a threshold surfacing relevance to the user account. If an interaction is received with web content in the web content pane, a web browser application may be automatically opened and navigated to the web content source of that web content.

BRIEF DESCRIPTION OF THE DRAWINGS

Non-limiting and non-exhaustive examples are described with reference to the following figures:

FIG. 4 illustrates an exemplary web content pane that includes curated web content that may be surfaced in an operating system shell construct.

DETAILED DESCRIPTION

Figure 1:
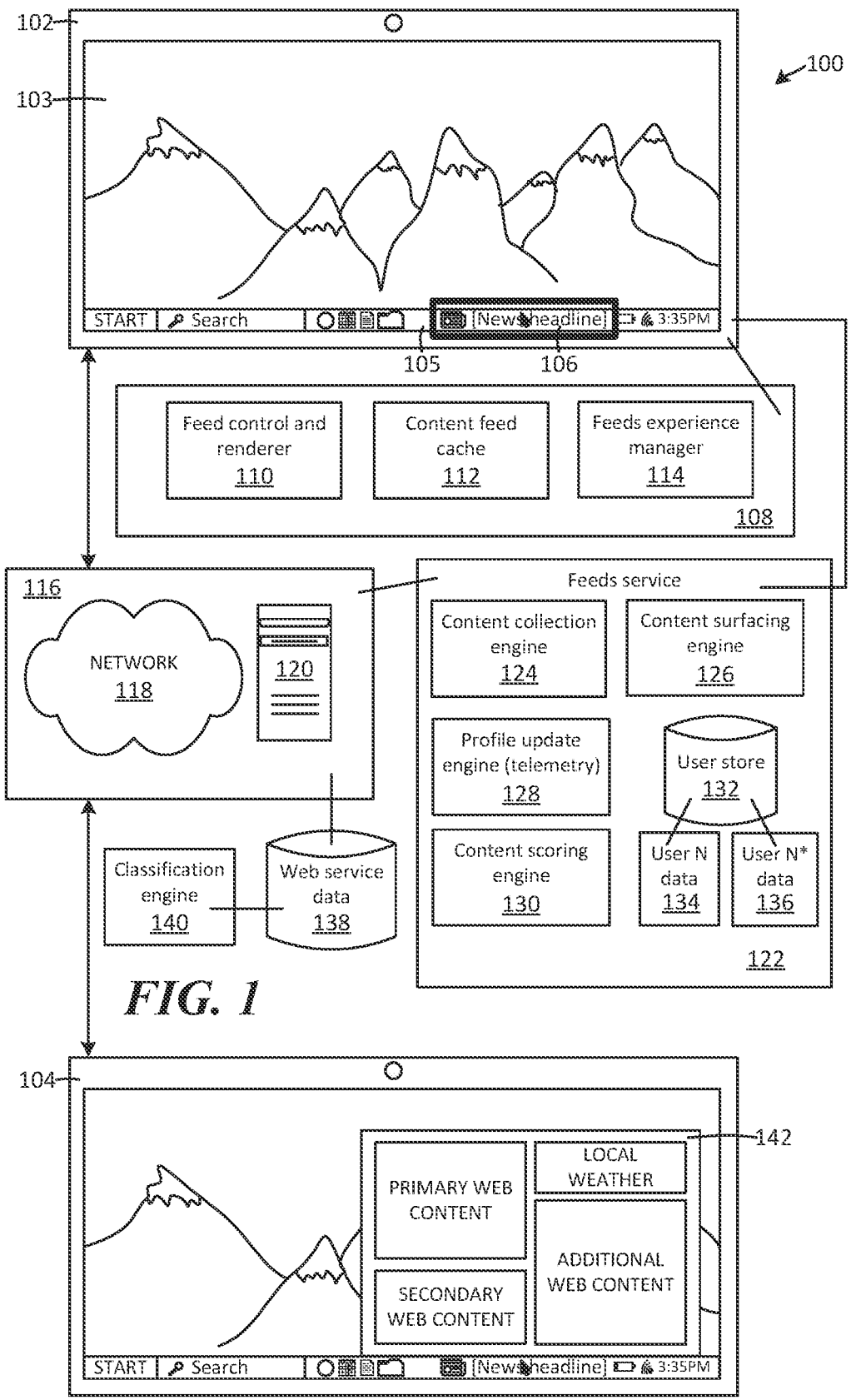
FIG. 1 is a schematic diagram illustrating an example distributed computing environment for surfacing curated web content in an operating system shell construct.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Examples of the disclosure provide systems, methods, and devices for surfacing web content in operating system shell constructs. As used herein, a shell is a computer interface which exposes an operating system's services to a human user or other programs. It is typically referred to as a shell because it is the outermost layer around the operating system. A web content feeds service may identify web content (e.g., webpages, online articles, weather data, sports data, financial data, blog posts) that is relevant to a user based on content preferences, geographic location, and/or demographic information associated with a user account of the user. The feeds service may be executed on a local computing device on which the web content is to be surfaced, in the cloud, or partially locally and partially in the cloud. The feeds service may communicate with one or more web services that maintain web content. The feeds service, or an intermediary service, may apply a web content scoring engine to the web content and calculate a relevance score for each piece of web content based on its relevance to a user account. If the relevance score for a piece of web content meets or exceeds a threshold value at least a subset of that web content, or information associated with that web content, may be caused to be surfaced in an operating system shell construct.

A determination may be made as to how much free space is available in a taskbar of a desktop. If a determination is made that there is greater than a threshold amount of free space available in the taskbar, the feeds service may cause a web content element of a first size to be surfaced in the taskbar. If a determination is made that there is less than a threshold amount of free space available in the taskbar, the feeds service may cause a web content element of a second size that is smaller than the first size to be surfaced in the taskbar. The web content element may include a portion of content from a first piece of web content for which a relevance score was determined to meet or exceed the threshold surfacing value. The web content element may be interacted with (e.g., via a mouse click, via a touch input, via a cursor hover) and that interaction may cause additional web content corresponding to the first piece of web content to be surfaced. The additional web content may be surfaced in a web content pane. In some examples, the web content pane may include the additional web content corresponding to the first piece of web content and other web content from one or more additional sources. The web content in the web content pane may be surfaced in content cards, with each content card including at least a portion of web content from one or more web content sources. The web content that is surfaced in the web content pane may be interacted with (e.g., via a mouse click, via a touch input, via a cursor hover), and that interaction may cause a web browser application to be opened and automatically navigated to the source of the interacted-with web content.

The web content that is surfaced in the taskbar web content element may comprise baseline web content or rotational content. Baseline web content may have to meet a first surfacing relevance value threshold prior to being surfaced in a taskbar web content element. Alternatively, rotational web content may have to meet a second surfacing relevance value threshold prior to being surfaced in a taskbar web content element (e.g., to replace baseline web content as the taskbar web content element). Thus, the relevance threshold for surfacing rotational web content may be higher than for baseline web content. Rotational web content may have time limits associated with it such that it may only be surfaced in the shell surfaces (e.g., in the taskbar web content element) for a specified duration of time before the shell surfaces revert to baseline web content or different rotational web content that is determined to have met a threshold relevance value. In additional examples, users may have the ability to adjust settings and turn the surfacing of rotational content on or off (e.g., to keep their experience more static).

In some examples, the feeds service may automatically modify the height and/or width of web content panes. For example, the feeds service may customize the height and/or width of the web content pane experience (e.g., hover and/or for click) depending on what fits the content or content type and user experience of the operating system environment best. In additional examples, a user may manually modify the height and/or width of web content panes. In additional examples, the feeds service may surface one or more first types of web content via web content panes via interaction with a first shell construct (e.g., surface weather-related web content in a search bar shell construct) and one or more second types of web content via interaction with a second shell construct (e.g., surface sports and entertainment-related web content via a taskbar shell construct).

The systems, methods, and devices described herein provide technical advantages for surfacing and interacting with web content. Web content can be automatically intelligently categorized and surfaced in a non-distracting manner such that users can easily view updates about information that is relevant to them while maintaining focus on a single device. Memory and processing costs associated with browsing to web content and caching that information on multiple devices is reduced via the mechanisms described herein by reducing the amount of multi-device browsing needed to stay current on relevant information. Providing web content in easily accessible operating system shell constructs also reduces the number of applications that need to be open simultaneously to identify and view relevant content. Additionally, web content that is identified as being relevant to a user (e.g., user account) may be cached on the local device such that it is immediately available upon user request. If a user chooses to engage with hinted content in the shell construct via a lightweight interaction such as a hover, click, or gesture, additional context may be made immediately available in a shell flyout experience. This experience allows users to learn more about the information they see in a friction-free manner that enables them to stay within their context and flow. In some examples, the type of additional context that is provided in response to a user input may be dependent on the type of input (e.g., hover, mouse click, stylus input) that is received. In additional examples, the presentation type that the additional contextual information is surfaced in may be dependent on the type of input that is received.

Once a user has engaged with shell web content, they may be provided with a continuous experience between the integrated shell elements and the browser. These experiences (e.g., via the feeds service) both understand the user with the same identity and are connected experiences. If the user expresses a preference on one canvas, it may be shared with the other (e.g., topics, news publishers, time limits). The flyout experience (e.g., the web content pane and content cards), powered by the web inside the shell, may also push changes back to other shell surfaces to ensure preferences are taken into effect (e.g., interests and unit preferences for temperature). These changes and preferences may also be incorporated in constructs on other devices (e.g., smart phone, tablet) such that the news and other web content a user cares about will roam with them and it will feel like one extended experience across form-factors. This approach is unique on a modern operating system. Integrating the manual process of interacting with lightweight web content elements and the automated process of identifying highly relevant web content thus saves user time and computing resources.

FIG. 1 is a schematic diagram illustrating an example distributed computing environment 100 for surfacing curated web content in operating system shell surfaces. Computing environment 100 includes computing device 102 and computing device 104, which are the same computing device. Computing environment 100 also includes network and processing sub-environment 116, feeds service 122, client device sub-environment 108, web service data store 138, and classification engine 140. Although feeds service 122 is primarily illustrated and described herein as being cloud-based, one or more elements or engines described as being encompassed by feeds service 122 (e.g., content surfacing engine, profile update engine 128) may be maintained and/or executed by a local computing device, such as computing device 102 and computing device 104. Similarly, although client device sub-environment 108 is primarily illustrated and described herein as being encompassed by a local computing device (e.g., computing device 102, computing device 104), it should be understood that one or more of the elements described therein (e.g., feed control renderer 110, feeds experience manager 114) may be cloud-based (e.g., incorporated in feeds service 122 and/or network and processing sub-environment 116).

Computing device 102 displays background 103 and taskbar 105. Taskbar 105 is a construct of the operating system executed by computing device 102. Moving from left to right, taskbar 105 includes a start button, a search box, four jump elements, and taskbar web content element 106. Computing device 102 also includes client device sub-environment 108, which includes feed control and renderer 110, content feed cache 112, and feeds experience manager 114.

Network and processing sub-environment 116 includes network 118, via which any of the computing devices described herein may communicate, and server computing device 120. Server computing device 120 is illustrative of one or more computing devices that may host one or more cloud-based services (e.g., feed service 122, web application services, news services, sports services, weather services, finance services). Feeds service 122 includes content collection engine 124, content surfacing engine 126, profile update engine 128, content scoring engine 130, and user store 132 (which includes user N data 134, and user N* data 136). Feeds service 122 may perform operations associated with identifying relevant content to surface via operating system shell constructs (e.g., via interaction with taskbar web content element 106), determining when to surface that web content, and when to rotate web content in the web content elements of the operating system shell.

Although user store 132 is illustrated as being included in feeds service 122, it should be understood that user store 132 may reside or be associated with one or more other services and feeds service may communicate with user store 132. For example, user store may be associated with a productivity application service that hosts data for one or more user accounts that utilize productivity applications hosted or otherwise integrated with the productivity application service. User N data 134 may include data associated with a user account (e.g., for user N) that accesses one or more of the applications of the productivity application service. Those applications may include web browser applications, task completion applications, electronic calendar applications, electronic messaging applications, email applications, word processing applications, and presentation applications, for example. In some examples, user N data 134 may include user preferences and/or data collected from one or more of the productivity applications while user N was signed into a user account of the productivity service. User N data 134 may include explicit web content preferences (e.g., preferences for types of web content explicitly input and specified by user N) or implicit web content preferences (e.g., preferences for types of web content determined based on web browsing patterns, preferences for types of web content determined based on processing of web browser or other application inputs or signals, type of web content interacted with, frequency of web content interacted with, types of applications that are installed, current computing context, primary or secondary account configurations). User N* data 136 may include the same types of data and preferences. However, user N* data 136 is illustrative of one or more other user accounts and the associated data and preferences for those user accounts.

Profile update engine 128 may receive inputs associated with a user account and update scores, weights, and/or preferences associated with the user account. Those scores, weights, and/or preferences may be updated and associated with the user account in user store 132. For example, a user account may be updated to reflect that a user likes or does not like certain types of content or the way that certain types of content is presented by feeds service 122 based on implicit or explicit signals (e.g., a user explicitly indicating a preference for a content type or presentation type, a user implicitly indicating a preference for a content type or presentation type via interacting a threshold number of times with that type of content or presentation or for a threshold duration of time, implicit preference determined from browsing history). In some examples, a user may explicitly indicate a like or dislike for web content based on interactive user interface elements included in a web content pane (e.g., a user can like stories, use reactions, ask for more/less similar content, block publishers, hide stories, save for later, share or report an issue).

Web service data store 138 may include data collected from one or more websites or web services (e.g., news websites and services, sports websites and services, weather websites and services, financial websites and services, entertainment websites and services). Web services data store 138 may include articles, blog posts, stories and/or webpages associated with those websites and services. Classification engine 140 may be associated with feeds service 122 or the productivity application service described above. Classification engine 140 may topically classify the articles, blog posts, stories, and/or webpages included in web services data store 138. Those topical classifications may then be associated (e.g., via metadata, via tags) with the corresponding content in web service data store 138. Classification engine 140 may analyze text of webpages utilizing natural language processing models that have been trained to topically classify text. In additional examples, classification engine 140 may analyze images of webpages utilizing image neural networks that have been trained to topically classify images. In still additional examples, classification engine 140 may analyze URLs and/or HTML headings or tags to topically classify web content.

Content collection engine 124 may communicate with web service data store 138 and collect web content, which may have topical classifications associated with it, that is relevant to one or more user accounts (e.g., user accounts associated with user store 132). Content scoring engine 130 may score web content collected by content collection engine 124 based on its relevance to user accounts associated with user store 132. For example, if user N is currently signed into computing device 102, content scoring engine 130 may score web content collected by content collection engine 124 for its relevance to the account of user N (e.g., based on user N's content preferences). Content scoring engine 130 may also rank web content based on the scores it has assigned to the web content. Additional description related to content scoring engine 130 is provided below in relation to FIG. 2. Content surfacing engine 126 may perform operations associated with identifying one or more pieces of web content that have highest ranks assigned to them based on their scores relative to a user account and sending that web content to a client computing device (e.g., computing device 102, computing device 104) for surfacing via a web content element (e.g., taskbar web content element 106).

Computing device 102 may receive one or more pieces of highest ranked content relative to the user account signed into computing device 102 and save that content to content feed cache 112. In some examples, content feed cache 112 may receive web content periodically or anytime new web content is identified as meeting a threshold relevance to the user account signed into computing device 105. For example, content surfacing engine 126 may only send web content to computing device 102 if its relevance score (determined by content scoring engine 130) to the user account signed into computing device 102 meets or exceeds a threshold value.

Feed control and renderer 110 may receive a notification once new web content has been received and/or cached by computing device 102. Feed control and renderer 110 may determine how and when to render that web content in an operating system shell construct (e.g., in taskbar web content element 106). In some examples, if more than one piece of web content is cached by content feed cache 112, feed control and renderer 110 may determine whether and with what frequency to rotate that web content in an operating system shell construct (e.g., in taskbar web content element 106).

Feeds experience manager 114 may receive indications of interactions with the web content that is surfaced in the operating system shell construct. For example, a user may interact with taskbar web content element 106 and feeds experience manager 114 may receive an indication of that interaction. The interaction may comprise a left click from a mouse device, a touch input, or a hover input of a cursor, for example. Upon receiving the indication, the experience manager alone or in combination with a feeds application (not shown) may determine whether a web content pane should be caused to be surfaced or caused to be no longer surfaced on the user interface. If a determination is made that a web content pane should be caused to be surfaced, a determination may also be made as to the size of the pane to be surfaced and a location for surfacing the pane on the user interface.

One or more elements associated with client device sub-environment 108 or feeds service 122 may analyze taskbar 105, determine an amount of free space in taskbar 105, and select a taskbar web content element size based on that determined amount of free space. For example, web content received from feeds service 122 may be indicated as being available for viewing via an icon if there is limited free space available on taskbar 105. Alternatively, as is the case in the illustrated example, if there is more space available on taskbar 105, web content received from feeds service 122 may be indicated as being available for viewing via an icon and descriptive text related to that icon. The determination as to how much free space is in taskbar 105 may be made at onboarding time (e.g., when the feature is first installed, each time the system boots up) or the determination may be made dynamically as a user and/or the computing device adds items to taskbar 105. Thus, in this example, web content element 106 includes a news icon that indicates that there is a news article that has been determined to be relevant to the user account associated with computing device 102 and web content element 106 includes the news headline corresponding to that news article. The news article web content may comprise rotational web content that has a specified time limit associated with it that it can be surfaced as web content element 106 prior to web content element 106 reverting to baseline web content or different rotational web content.

An interaction has been received at web content element 106. For example, an indication may have been received by feeds experience manager 114 that a cursor has been clicked on or hovered over web content element 106 for a threshold duration of time. Feeds experience manager 114, alone or in combination with a feeds application, may retrieve at least the cached web content corresponding to the news article that is referenced in web content element 106, and cause at least a portion of that cached web content corresponding to the news article to be surfaced in a web content pane. However, in this example cached web content from of a plurality of types and obtained from a plurality of sources (e.g., different websites, different web services) is caused to be displayed in web content pane 142. Specifically, web content pane 142 includes primary web content corresponding to the news article that is referenced in web content element 106, secondary web content obtained from a second source, local weather content obtained from a third source, and additional web content obtained from a fourth source. Each of primary web content, secondary web content, local weather content, and additional web content surfaced in web content pane 142 may comprise a subset of content of the corresponding content from the original sources (e.g., the websites or web services where the web content was originally received by feeds service 122). In examples, if primary web content, secondary web content, local weather content, or additional web content is interacted with in web content pane 142, a web browser application may be automatically launched and navigated to the source of the corresponding web content.

Figure 2:
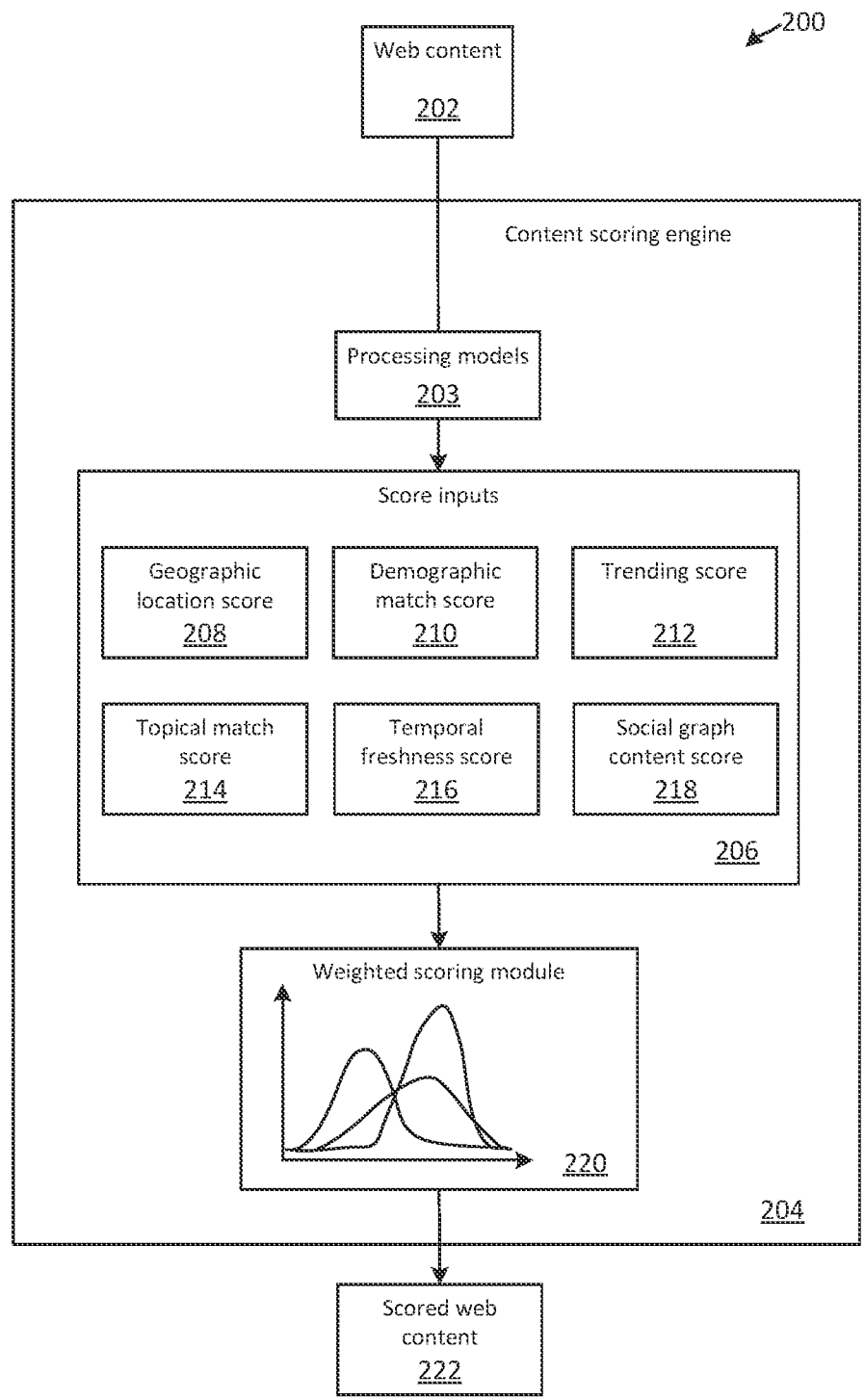
FIG. 2 illustrates an exemplary block diagram of a computing environment for scoring web content.

FIG. 2 illustrates an exemplary block diagram of a computing environment 200 for scoring web content. Computing environment 200 includes web content 202, content scoring engine 204, and scored web content 222. Web content 202 may comprise a webpage, an online article, aggregated data related to a topic (e.g., aggregate weather data for a specific location, aggregate political data related to an election), sports data (e.g., football game scores, basketball game scores, game statistics, player statistics), financial data (e.g., market data, stock prices), or social media content (e.g., connection posts, trending topics). Web content 202 may be received by the feeds service from individual web sources (e.g., a news website, a sports website, a financial website, a weather website), or web content 202 may be compiled by a web service and directed to the feeds services.

Web content 202 may be processed by one or more processing models 203. Processing models 203 may comprise one or more natural language processing models that have been trained to classify textual content into topical categories (e.g., sports, politics, weather, entertainment) and/or geographic location categories (e.g., where is the content applicable to). For example, processing models 203 may comprise one or more embedding models (e.g., Bidirectional Encoder Representations from Transformers (BERT), Embeddings from Language Models (ELMo)). In other examples, processing models 203 may comprise a recurrent neural network (RNN) model, a long short-term memory (LSTM) model, and/or a gated recurrent units (GRU) model. In some examples a nearest neighbor model (e.g., KNN) may be utilized to determine similarity scores between embeddings. In additional examples, processing models 203 may comprise one or more image neural networks that have been trained to classify image content into topical categories.

In addition to processing models 203, content scoring engine 204 includes score inputs 206. One or more of score inputs 206 may have been determined, at least in part, based on application of one or more processing models 203 to web content 202. Score inputs 206 include geographic location score 208, demographic match score 210, trending score 212, topical match score 214, temporal freshness score 216, and social graph content score 218. One or more of score inputs 206 may be utilized in calculating a final score corresponding to web content 202's relevance to a user account.

Geographic location score 208 may correspond to web content 202's geographic relevance to a specific user's location (e.g., based on a determined geographic location of the user's account, based on a location of a computing device that a user account is signed into, based on a determined geographic location associated with an IP address utilized by computing device). For example, political news covering the governor of Washington State would have a higher geographic location score for a user account that is identified as being in Washington State than for a user account that is identified as being in Ohio. Alternatively, political news covering the presidential election may have a same geographic location score for user accounts in Washington State and Ohio. In additional examples, a user may express an interest in a location that the user is not located at, and geographic location score 208 may increase based on being associated with that location.

Demographic match score 210 may correspond to web content 202's topical relevance to one or more demographic categories of a user account. For example, if a user account is identified as belonging to an adult in the software industry, software-related web content may have a higher demographic match score than for a user account that is identified as belonging to child in middle school. Similarly, some web content may have more relevance to males or females and the demographic match score may reflect that relevance.

Trending score 212 may correspond to web content 202's current popularity at its source location (e.g., the website it was originally posted on), or one or more social media services. For example, web content 202 may have a higher trending score if it is identified as being accessed one million times in the last 24 hours compared to if it is identified as being accessed one hundred times in the last 24 hours.

Topical match score 214 may correspond to web content 202's topical relevance to topical interests associated with a user account. For example, one or more topical categories may have interest scores assigned to them for a user account. The scores may be assigned based on explicit web content preferences (e.g., preferences for types of web content explicitly input by user N) or implicit web content preferences (e.g., preferences for types of web content determined based on web browsing patterns, preferences for types of web content determined based on processing of web browser or other application signals).

Temporal freshness score 216 may correspond to web content 202's newness. For example, a new piece of web content (e.g., posted in the last hour) may have a higher temporal freshness score assigned to it than an older piece of web content (e.g., posted two weeks ago).

Social graph content score 218 may correspond to web content 202's popularity with other user accounts that are determined to be associated with a specific user account that the score is being calculated for. For example, processing models 203 may analyze social media connections or company connections associated with a user account and identify web content that has been interacted with online by those connections. If web content has been interacted with more (e.g., read, posted, shared, etc.) by contacts (or close contacts) of the specific user account it may have a higher social graph content score assigned to it than web content that has not been interacted with as much by contacts (or close contacts) of the specific user.

Content scoring engine 204 may apply weighted scoring module 220 to one or more of score inputs 206 in calculating a final score for web content 202 corresponding to its relevance to a specific user account. For example, weighted scoring module 220 may weight one or more of score inputs 206 higher than others in calculating a final output score for web content 202. In some examples, the weights for score inputs 206 may be adjusted over time via application of a machine learning model that has been trained to weight scores appropriately based on a user account's interactions, or lack of interactions, with web content. For example, if web content is surfaced to a user account based on its final score (based on application of weighted scoring module 220 to one or more of score inputs 206) and that web content is interacted with in a web content pane, the weight of topical match score 214 may be increased. Alternatively, if trending web content is rarely interacted with by a user account, the weight of trending score 212 may be decreased.

Once weighted scoring module 220 has assigned a final score of web content 202's relevance to a user account, that score is associated with web content 202 as illustrated by scored web content 222. Scored web content 222 may then be provided to the feeds service for further processing. For example, if the final score associated with web content 202 meets a threshold value based on its relevance to a specific user account, a subset of that web content, or information associated with that web content, may be caused to be surfaced in a taskbar web content element of a corresponding desktop of a device associated with the specific user account. Alternatively, if the final score associated with web content 202 does not meet a threshold value based on its relevance to a specific user account, that web content may not be surfaced to the user account.

Figure 3:
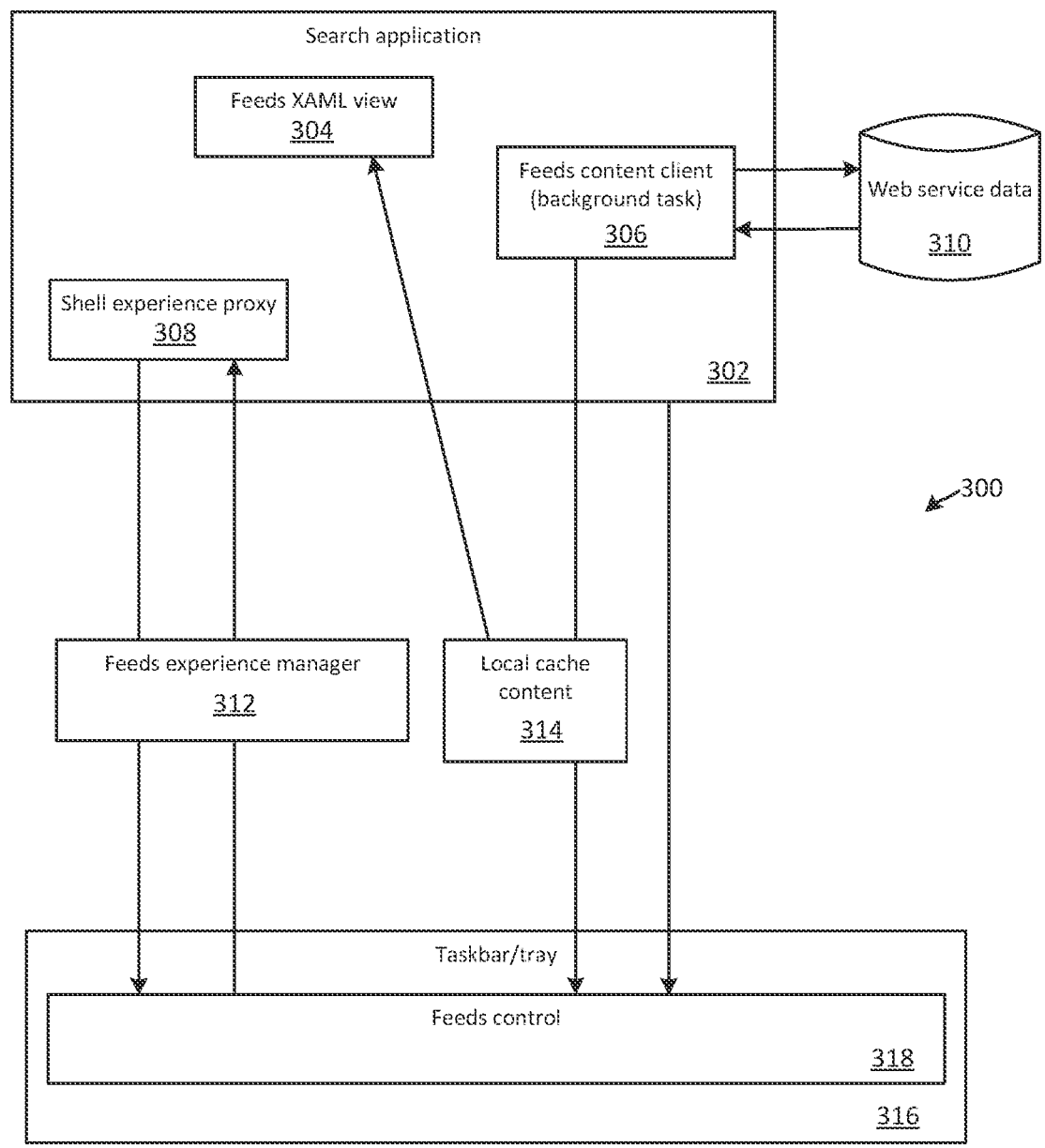
FIG. 3 illustrates an exemplary block diagram of a distributed computing environment for surfacing web content in an operating system shell construct.

FIG. 3 illustrates an exemplary block diagram of a distributed computing environment 300 for surfacing web content in an operating system shell construct. Computing environment 300 includes search application element 302, which includes feeds XAML view element 304, feeds content client element 306, and shell experience proxy element 308; web service data store element 310; feeds experience manager element 312; local cache content element 314; taskbar/tray element 316, and feeds control element 318.

Feeds experience manager element 312 may host search application element 302 and be comprised on a local computing device (e.g., computing device 102). In other examples, feeds experience manager element 312 may be at least partially comprised in the cloud as part of a feeds service.

Search application element 302 communicates with web service data store element 310 and obtains web content that has been determined to be relevant to a user account. The obtained web content may be topically and/or locationally categorized and scored based on its relevance to the user account. The search application may obtain this web content via feeds content client element 306, which may retrieve the web content periodically (e.g., every X minutes, hours, or days). In some examples, the feeds service may define when feeds content client element 306 should be called, and thus web content retrieved. Thus, in some examples, content client element 306 may be dynamically and intelligently called, such as to increase the frequency of retrieving web content for certain events (e.g., for elections, for sports scores). The web content obtained via feeds content client element 306 may then be cached by local cache content element 314.

Feeds control element 318 may receive an indication, via feeds experience manager element 312, that a surfaced operating system shell element (e.g., a taskbar element), which indicates cached web content is available, has been interacted with (e.g., via a click, via a hover, via a touch input) in taskbar/tray element 316. Feeds control element 318 may communicate with search application element 302, via shell experience proxy element 308, and surface web content from local cache content element 318 in an operating system shell construct (e.g., in one or more content cards in a web content pane flyout). The web content may be surfaced via feeds XAML view element 304 and interacted with for causing a web browser instance to be automatically surfaced and navigated to a web content source. The experience in the web content pane flyout may be a WebView hosted inside an XAML frame. This enables a great deal of flexibility on the server side over the user experience, such that the experience can iterate rapidly and run an A/B experience at scale.

Figure 4:
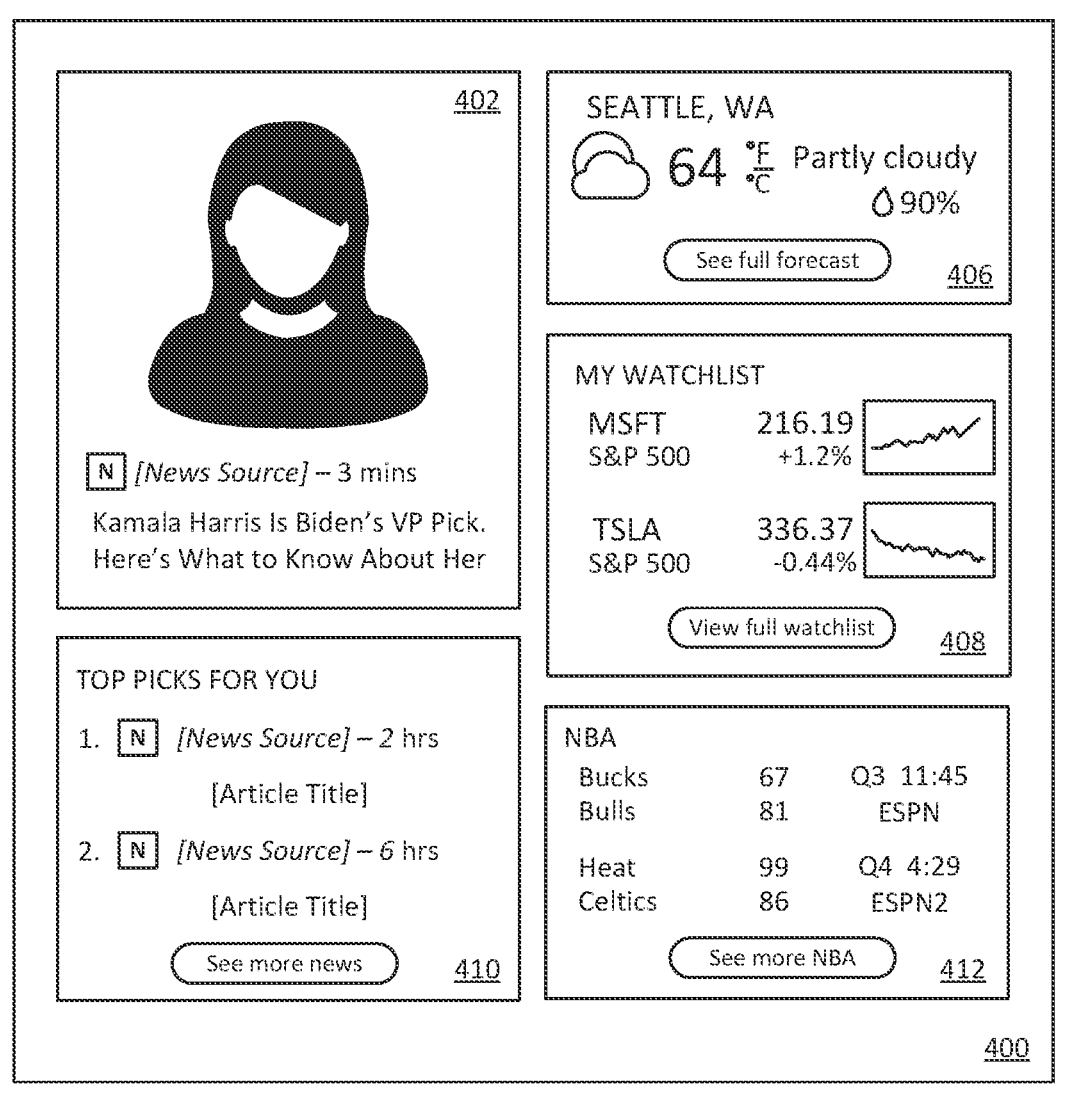

FIG. 4 illustrates an exemplary web content pane 400 that includes curated web content that may be surfaced in an operating system shell construct. Web content pane 400 includes first content card 402, second content card 410, third content card 406, fourth content card 408, and fifth content card 412. It should be understood that more or fewer content cards may be caused to be surfaced in a web content pane based on settings associated with the feeds service, display space on a desktop, and/or web content's determined relevance to a user account. Additionally, the feeds service may have control over the amount of content that is surfaced in web content pane 400 (e.g., is there content that can be scrolled too via a scroll bar or other interaction mechanism).

Each of the content cards in web content pane 400 may have been included in web content pane 400 based on the corresponding web content being determined to have met a threshold relevance score to a user account (e.g., the user account that is signed into an operating system on which web content pane 400 is surfaced on). Web content pane 400 may have been surfaced based on a received interaction with a web content element in a taskbar having display properties associated with web content corresponding to one or more of the content cards. For example, a news icon web content element (including or not including all or part of the headline of content card 402) in a taskbar may have been hovered over or clicked on, and web content pane 400 may have thereby been caused to be surfaced by the feeds service, search application, feed control and renderer, and/or feeds experience manager.

First content card 402 includes a subset of content from first web content derived from a first web content source. For example, the web content source for first content card 402 is a news article from the publisher [News Source] with the title "Kamala Harris Is Biden's VP Pick. Here's What to Know About Her". First content card 402 does not include the full article, but rather a portion, or subset, of the web content corresponding to that article. For example, the image surfaced in first content card 402 may be cropped or otherwise downsized so that it can fit in first content card 402, and the body of the article is not included in first content card 402.

Second content card 410 includes a subset of content from second web content and a second web content source, and third web content and a third web content source. That is, second content card includes the identity of a news source corresponding to the publisher of a second article and the title of that second article, as well as the identity of a news source corresponding to the publisher of a third article and the title of that third article. Second content card 410 also includes the description "TOP PICKS FOR YOU" and a selectable element at the bottom of the card to have the descriptions of additional news articles surfaced in second content card 410, or in a web browser application.

Third content card 406 includes aggregate web content from at least a fourth web content source (although it could be aggregate web content from multiple web content sources). Specifically, third content card 406 includes weather web content that is specific to a user account associated with web content pane 400. The weather web content may have been derived from one or more weather websites and/or services. Third content card 406 includes the name of the location that the weather content is surfaced for (e.g., Seattle, Wash.), a weather type icon (partly cloudy), the temperature (64 degrees), a description of the weather type ("partly cloudy), the precipitation likelihood (90%) and a selectable option to have the full forecast surfaced (e.g., "See full forecast").

Fourth content card 408 includes aggregate web content from at least a fifth web content source (although it could be aggregate web content from multiple web content sources). Fourth content card includes the text "MY WATCHLIST" at the top of the card. Fourth content card 408 includes stock price web content that is specific to a user account (e.g., a determination has been made based on explicit or implicit web browsing patterns, preferences, or signals, that a user associated with a user account is interested in the stocks for which stock prices are surfaced). That is, fourth content card 408 includes the stock price for Microsoft and Tesla, in addition to a selectable option to have additional stocks that are on the user's "watchlist" surfaced in fourth content card 408, or in a web browser application.

Fifth content card 412 includes sports scores for two NBA games in addition to time information in those games and the identity of broadcast networks that are televising those games. The sports scores web content may have been obtained from at least a sixth web content source (although it could be aggregate web content from multiple web content sources). The top of fifth content card 412 states "NBA" and below that are the identities of teams for two currently active NBA games with the game scores and time left in the quarters they are playing in. In examples, the sports scores in content card 412 may be surfaced in web content pane 400 because the user account has expressed an interest in those teams (e.g., as determined from explicit and/or implicit web browsing inputs), and because the relevance of those scores meets or exceeds a threshold surfacing score based on relevance to the user account. Fifth content card 412 also includes a selectable user interface element for surfacing additional scores and/or NBA web content in fifth content card 412, or in a web browser application. That selectable user interface element states "See more NBA".

An interaction may be received at any of the content cards in web content pane 400 and that interaction may cause a web browser to be automatically opened and navigated to the source of the web content in the content card. In additional examples, an interactive user interface element (e.g., a "see more news" button) may be included in web content pane, which if interacted with, may automatically cause a web browser application to be opened and surfaced with additional web content in it.

Figure 5A:
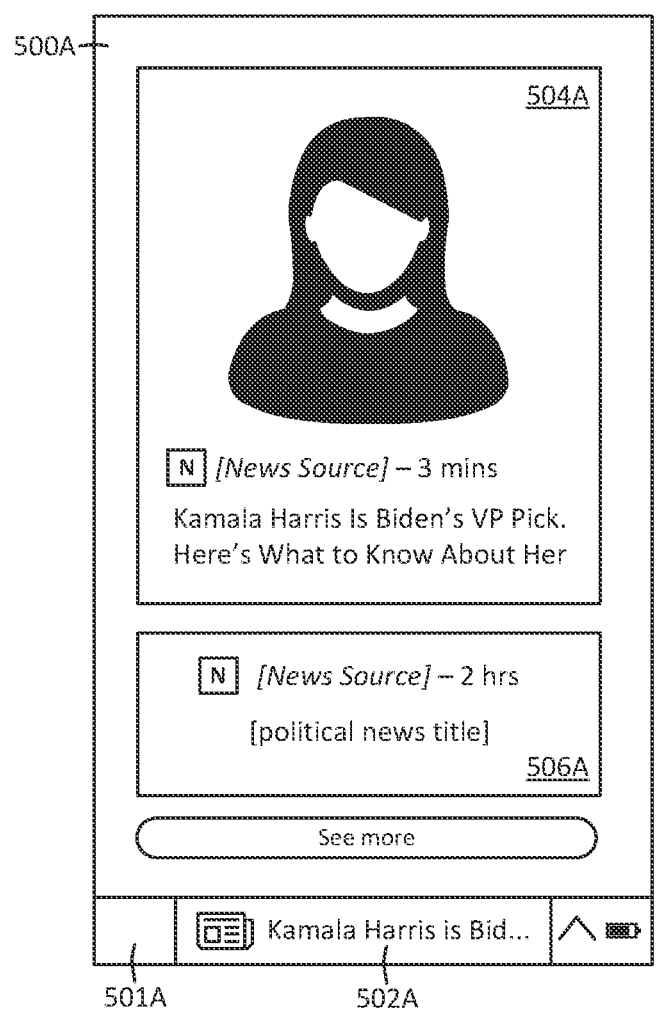
FIG. 5A illustrates an exemplary web content pane that includes curated news web content that may be surfaced in an operating system shell construct.

FIG. 5A illustrates an exemplary web content pane 500A that includes curated news web content that may be surfaced in an operating system shell construct. Web content pane 500A includes first content card 504A and second content card 506A. Web content pane 500A is shown as being surfaced from taskbar 501A based on receiving an interaction with web content element 502A in taskbar 501A. Web content element 502A includes a news article icon with an excerpt of the title of the first piece of web content corresponding to first content card 504A. Specifically, the excerpt states "Kamala Harris is Bid . . . " In some examples the excerpt may scroll through the entirety of the title of the article in the taskbar.

First content card 504A includes a subset of content from first web content derived from a first web content source. For example, the web content source for first content card 504A is a news article from the publisher [News Source] with the title "Kamala Harris Is Biden's VP Pick. Here's What to Know About Her". First content card 504A does not include the full article, but rather a portion, or subset, of the web content corresponding to that article. For example, the image surfaced in first content card 504A may be cropped or otherwise downsized so that it can fit in web content pane 500A and/or first content card 504A, and the body of the article is not included in first content card 504A.

Second content card 506A includes a subset of content from second web content and a second web content source. That is, second content card 506A includes the identity of a news source corresponding to the publisher of a second article and the title of that second article.

First content card 504A may be surfaced above second content card 506A, more prominently than second content card 506A, and/or with more web content than second content card 506A because its web content (e.g., the article) has been determined to have a higher relevance score relative to the user account that web content pane 500A is being surfaced for. Additionally, the web content included in web content pane 500A (e.g., the web content corresponding to the two indicated news articles) have been surfaced based on having relevance scores relative to the user account that meet or exceed a threshold surfacing value. The web content in first content card 504A or second content card 506A may be interacted with (e.g., via click, via cursor hover, via touch input) and that interaction may cause a web browser application to be automatically opened and navigated to the source of the corresponding web content (e.g., to the news articles).

Figure 5B:
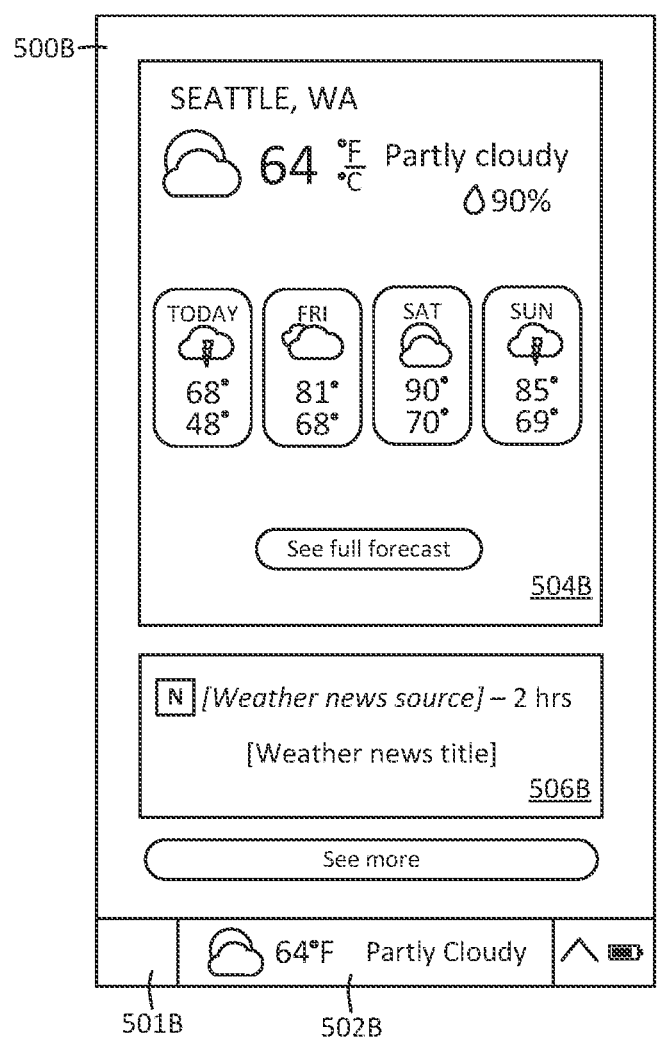
FIG. 5B illustrates an exemplary web content pane that includes curated weather web content that may be surfaced in an operating system shell construct.

FIG. 5B illustrates an exemplary web content pane 500B that includes curated weather web content that may be surfaced in an operating system shell construct. Web content pane 500B includes first content card 504B and second content card 506B. Web content pane 500B is shown as being surfaced from taskbar 501B. Web content element 502B includes a weather icon with a written description of the current weather (e.g., "Partly Cloudy"). In some examples, the content of web content element 502B may be periodically updated with the current weather. In additional examples, if new web content is determined to be more relevant than the weather content to the user account, of if new web content is determined to meet a threshold relevance score and the relevance score is higher than the relevance score for the weather web content, web content element 502B may be swapped out with an icon and corresponding web content element for the new web content.

First content card 504B includes aggregate web content derived from a web content source (although it could be aggregate web content form multiple web content sources). The web content source may be a weather website or service. The weather web content included in first content card 504B includes information that is geographically relevant to the user account that web content pane 500B is surfaced for. First content card 504B includes the name of the location that the weather content is surfaced for (e.g., Seattle, Wash.), a weather type icon (partly cloudy) corresponding to the current weather, the temperature (64 degrees), icons corresponding to the weather for today and the next three days, and a selectable user interface element for causing the full weather forecast to be surfaced (e.g., in first content card 504B or in a web browser application).

Second content card 506B includes a subset of content from a weather web content source. That is, second content card 506B includes the identity of a news source corresponding to the publisher of a weather-related news article and the title of that weather-related news article. Although in this example the web content of second content card 506B is related to the web content of first content card 504B, that need not be the case. In some examples, the feeds service may determine that it is not relevant to surface related content in one or more content cards. For example, if it is a cloudy day in Seattle, it may be more relevant to show a top headline in second content card 506B rather than a weather-related story. This may be the case regardless of the type of content in first content card 504B (e.g., if a primary or first content card includes sports-related content the other content cards need not necessarily include sports-related content).

First content card 504B may be surfaced above second content card 506B, more prominently than second content card 506B, and/or with more web content than second content card 506B because its web content (e.g., the current weather) has been determined to have a higher relevance score relative to the user account that web content pane 500B is being surfaced for. Additionally, the web content included in web content pane 500B (e.g., the current weather web content and the weather news article) have been surfaced based on having relevance scores relative to the user account that meet or exceed a threshold surfacing value. The web content in first content card 504B or second content card 506B may be interacted with (e.g., via click, via cursor hover, via touch input) and that interaction may cause a web browser application to be automatically opened and navigated to the source of the corresponding web content (e.g., a weather website, a news website that hosts the weather article).

Figure 5C:
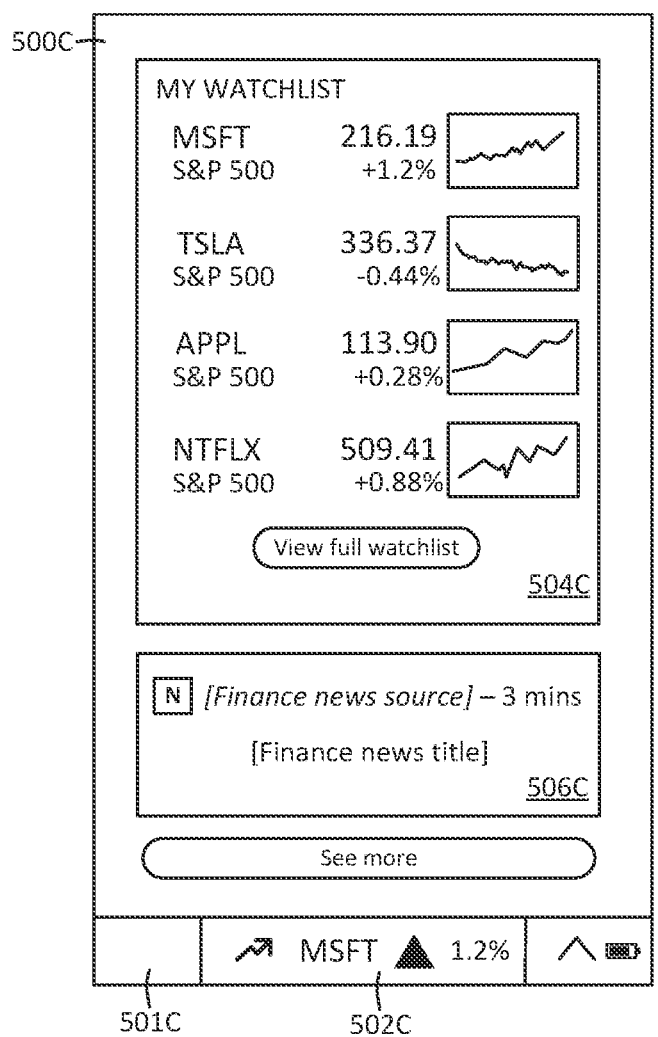
FIG. 5C illustrates an exemplary web content pane that includes curated financial web content that may be surfaced in an operating system shell construct.

FIG. 5C illustrates an exemplary web content pane 500C that includes curated financial web content that may be surfaced in an operating system shell construct. Web content pane 500C includes first content card 504C and second content card 506C. Web content pane 500C is shown as being surfaced from taskbar 501C based on receiving an interaction with web content element 502C in taskbar 501C. Web content element 502C includes a stock price icon with the name of a stock (MSFT) and its percentage in price change for the current day (1.2%). In examples, the percentage may increase or decrease based on updated information for the stock.

First content card 504C includes aggregate web content from a web content source (although it could be aggregate web content from multiple web content sources). First content card 504C includes stock price web content that is specific to a user account (e.g., a determination has been made based on explicit or implicit web browsing patterns, preferences, or signals, that a user associated with a user account is interested in the stocks for which stock prices are surfaced). That is, first content card 500C includes the stock price for Microsoft, Tesla, Apple, and Netflix, in addition to a selectable option to have additional stocks that are on the user's "watchlist" surfaced in first content card 504C or in a web browser application.

Second content card 506C includes a subset of content from a financial web content source. That is, second content card 506C includes the identity of a news source corresponding to the publisher of a finance-related news article and the title of that finance-related news article.

First content card 504C may be surfaced above second content card 506C, more prominently than second content card 506C, and/or with more web content than second content card 506C because its web content (e.g., the stock prices associated with the user account's watchlist) has been determined to have a higher relevance score relative to the user account that web content pane 500C is being surfaced for. Additionally, the web content included in web content pane 500C (e.g., the stock prices in the watchlist, the finance article) have been surfaced based on having relevance scores relative to the user account that meet or exceed a threshold surfacing value. The web content in first content card 504C or second content card 506C may be interacted with (e.g., via click, via cursor hover, via touch input) and that interaction may cause a web browser application to be automatically opened and navigated to the source of the corresponding web content (e.g., a finance website, a stock tracking website, a news website where the finance article is maintained).

Figure 5D:
FIG. 5D illustrates an exemplary web content pane that includes curated sports web content that may be surfaced in an operating system shell construct.

FIG. 5D illustrates an exemplary web content pane 500D that includes curated sports web content that may be surfaced in an operating system shell construct. Web content pane 500D includes first content card 504D and second content card 506D. Web content pane 500D is shown as being surfaced from taskbar 501D based on receiving an interaction with web content element 502D in taskbar 501D. Web content element 502D includes a basketball icon with the city abbreviations for two basketball teams that are currently playing.

First content card 504D includes names of teams, scores, times, and television networks for four NBA games that are currently taking place. That data may have been received from one or more web content sources (e.g., an NBA website, a multi-sport website, a team website). First content card 504D also includes a selectable user interface element (e.g., "See more NBA") for causing additional web content related to the NBA to be surfaced in content card 504D or a web browser application.

Second content card 506D includes a subset of content from a sports web content source. That is, second content card 506D includes the identity of a news source corresponding to the publisher of a sports-related news article and the title of that sports-related news article.

Figure 5E:
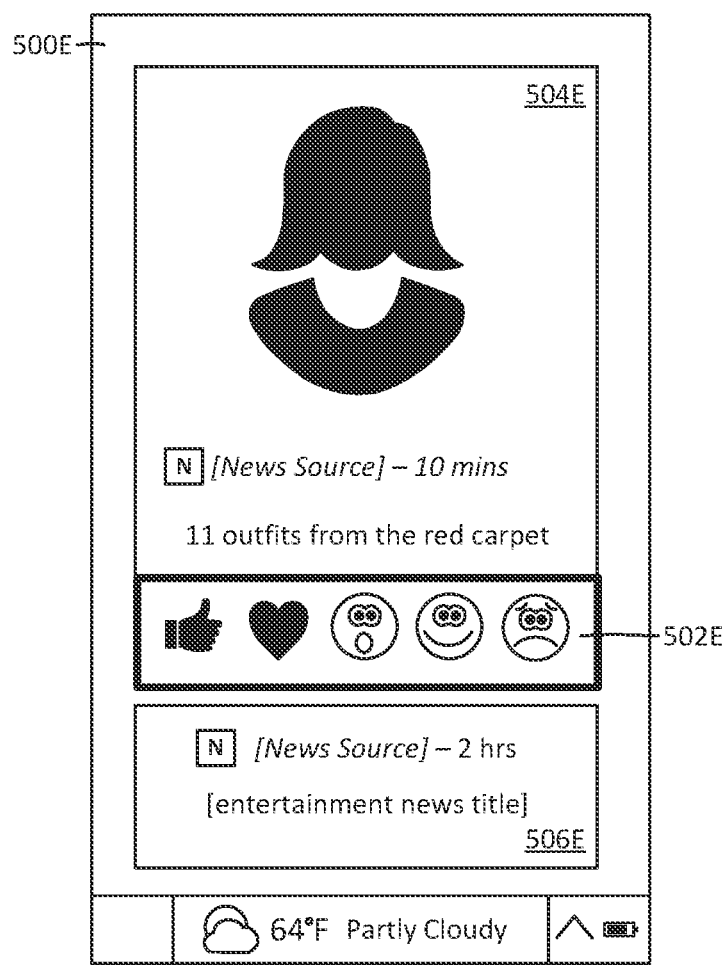
FIG. 5E illustrates an exemplary web content pane and elements incorporated therein for providing user feedback to a feeds service.

FIG. 5E illustrates an exemplary web content pane 500E and elements incorporated therein for providing user feedback to a feeds service. Web content pane 500E includes first content card 504E and second content card 506E. There is a plurality of interactive user interface elements 502E that a user may interact with in first content card 504E for providing feedback to the feeds service. This feedback may indicate a like or dislike for the content type and/or the content source corresponding to first content card 504E. In some examples, the feeds service may update a user's web content preferences based on a received interaction with one or more of user interface elements 502E.

User interface elements 502E are exemplary of a first mechanisms for providing user feedback to the feeds service directly from a web content pane. Additional mechanisms may be utilized. For example, one or more other elements may be included in web content pane 500E which may be interacted with that may cause a window for providing feedback to the feeds service to be surfaced. The window may include options for sharing the web content, saving the web content for later reading, indicating that more web content like the interacted-with web content should be surfaced to the user, indicating that less web content like the interacted-with web content should be surfaced to the user, hiding the web content, hiding or not further surfacing web content from a specific source, or reporting an issue.

Figure 6:
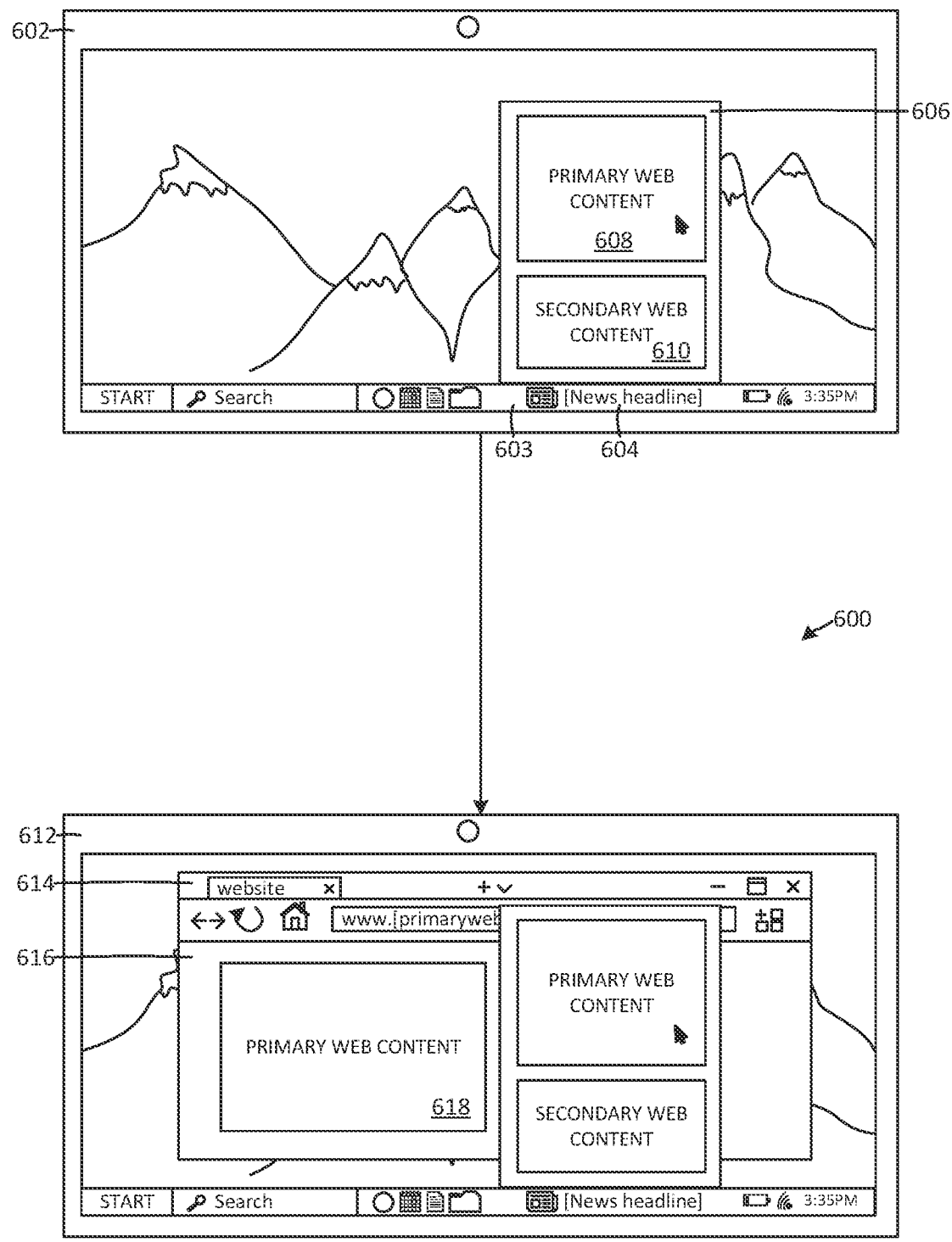
FIG. 6 is a computing environment illustrating interaction with curated web content in a web content pane surfaced via interaction with an operating system user interface element and the subsequent surfacing of a web browser for viewing full content corresponding to the interacted with web content.

FIG. 6 is a computing environment 600 illustrating interaction with curated web content in a web content pane surfaced via interaction with an operating system user interface element and the subsequent surfacing of a web browser for viewing full content corresponding to the interacted with web content. Computing environment 600 includes computing device 602 and computing device 612, which are the same computing device.

Computing device 602 displays taskbar 603 and web content element 604. Web content element 604 includes a news article icon with an excerpt of the title of a first piece of web content (e.g., a news article). An interaction (e.g., a mouse click, a cursor hover, a touch input) has been received at web content element 604, which causes web content pane 606 to be surfaced. Web content pane 606 includes first content card 608, having primary web content, and second content card 610, having secondary web content.

An interaction (e.g., a mouse click, a cursor hover, a touch input) has been received at first content card 608, which causes web browser application 614 to automatically be surfaced and navigated to the source of the primary web content that was surfaced in first content card 608, as indicated by primary web content 618.

Figure 7:
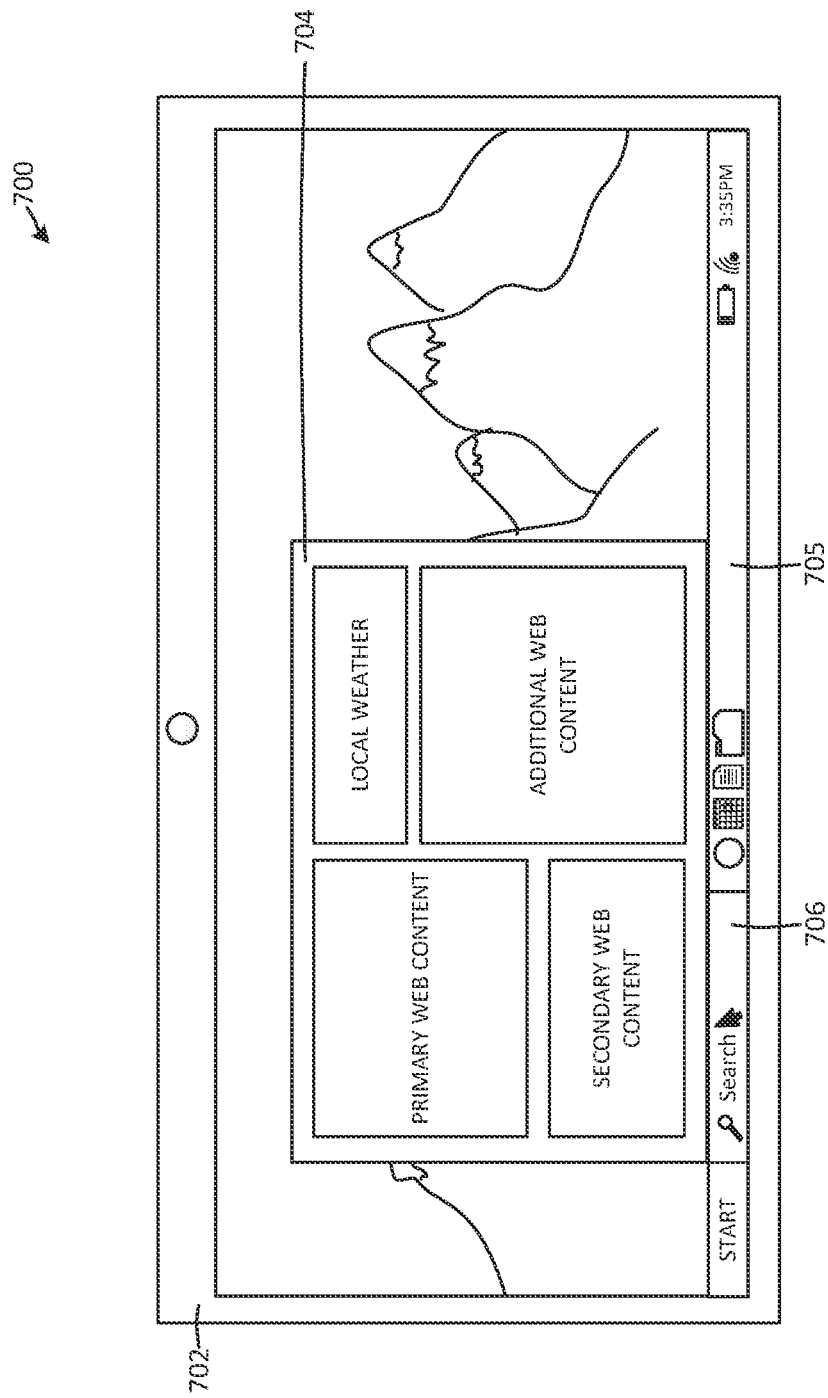
FIG. 7 is a computing environment illustrating the surfacing of a web content pane that includes curated web content via interaction with a search box in a taskbar.

FIG. 7 is a computing environment 700 illustrating the surfacing of a web content pane that includes curated web content via interaction with a search box in a taskbar. Computing environment 700 includes computing device 702, which displays taskbar 706. Taskbar 705 includes search box 706. An interaction (e.g., a mouse click, a cursor hover, a touch input) has been received at search box 706 which causes web content pane 704 to be surfaced on the desktop of computing device 702.

Figure 8:
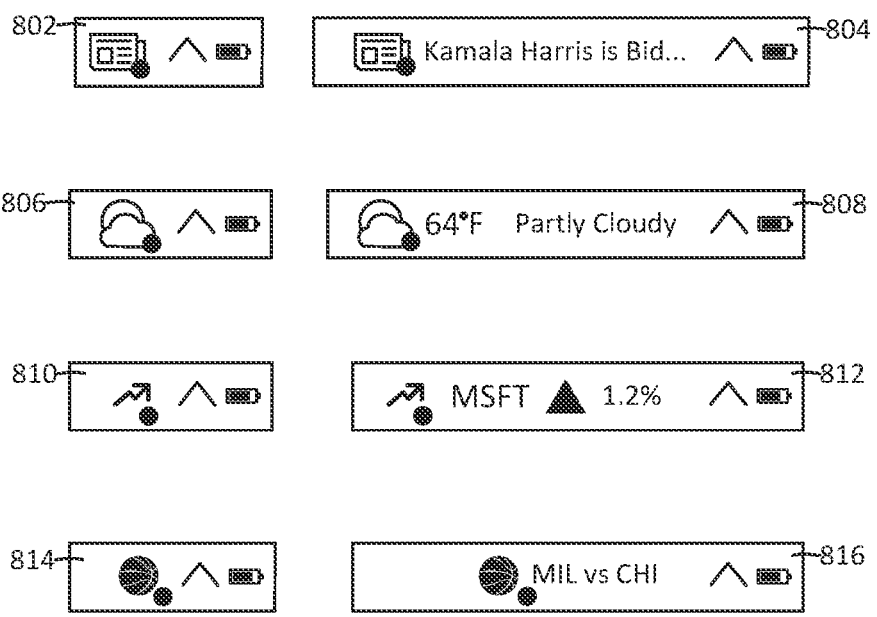
FIG. 8 illustrates various icon types and icon sizes that may be displayed in an operating system shell construct for interaction and subsequent surfacing of curated web content in a web content pane.

FIG. 8 illustrates various icon types and icon sizes that may be displayed in an operating system shell construct for interaction and subsequent surfacing of curated web content in a web content pane. These icons may be displayed as web content elements in taskbars. FIG. 8 includes first news web content element 802 and second news web content element 804, first weather web content element 806 and second weather web content element 808, first finance web content element 810 and second finance web content element 812, and first sports web content element 814 and second sports web content element 816. The web content elements on the left side of FIG. 8 (the smaller icons and web content elements) may be surfaced in a taskbar based on a determination that there is less than a threshold amount of free space in the taskbar. That determination may be made at onboarding time, boot time, and/or dynamically. The web content element son the right side of FIG. 8 (the larger icons and web content elements) may be surfaced in a taskbar based on a determination that there is more than a threshold amount of free space in the taskbar. That determination may be made at onboarding time, boot time, and/or dynamically. In this example the web content elements are badged to indicate that there is new web content that may be surfaced in a web content pane if the web content elements are interacted with.

Figure 9:
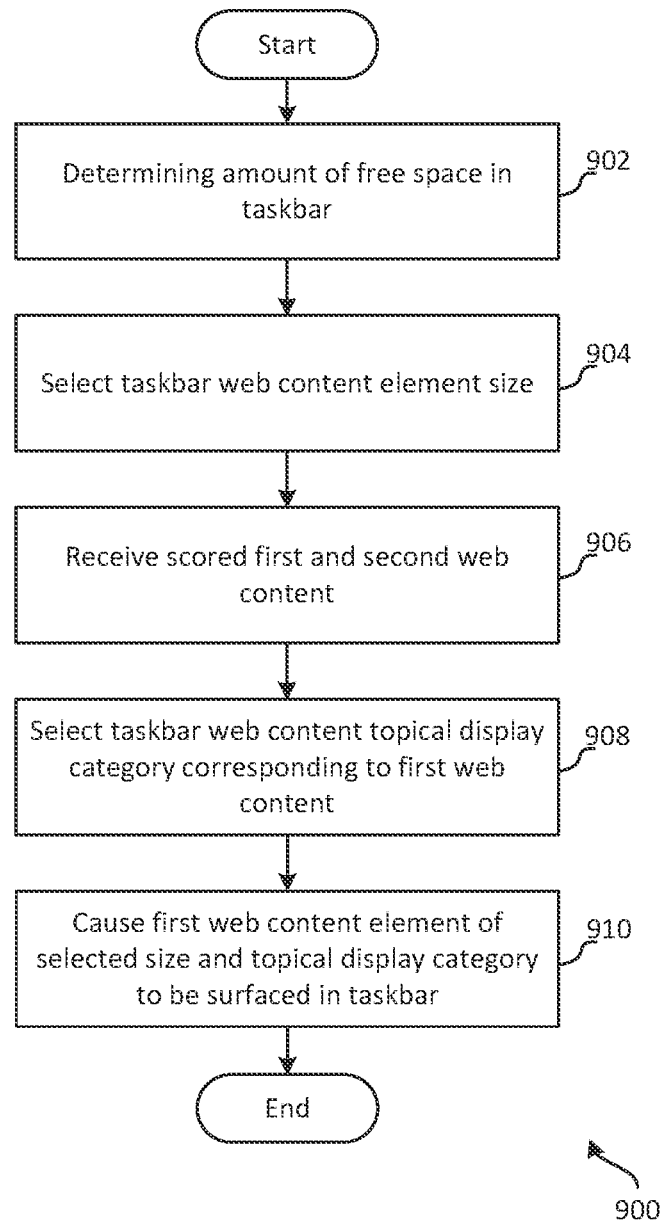
FIG. 9 is an exemplary method for surfacing web content in an operating system shell construct.

FIG. 9 is an exemplary method 900 for surfacing web content in an operating system shell construct. The method 900 begins at a start operation and flow moves to operation 902.

At operation 902 a determination is made as to an amount of free space in a taskbar on a user interface. In examples, determination may be a percentage of free space in the taskbar or a ratio of free space in the task bar to filled space in the task bar. In other examples, the determination may simply be a total amount (e.g., 10 cm$^2$, 75 mm$^2$) of free space in the task bar. Thus, because the taskbar may have various items in it already, such as shortcuts, electronic clocks, and other device data (e.g., battery life, Wi-Fi connection), a determination is made as to an amount of space that is available for surfacing other content.

From operation 902 flow continues to operation 904 where a taskbar web content element size is selected based on the determined amount of free space in the taskbar. The web content element size is selected from a first size having a first amount of information, and a second size having a second amount of information. For example, if a determination is made that there is greater than a threshold amount of free space available in the taskbar, a web content element of a first size may be caused to be surfaced in the task bar. Alternatively, if a determination is made that there is less than a threshold amount of free space available in the taskbar, a web content element of a second size that is smaller than the first size may be caused to be surfaced in the task bar.

From operation 904 flow continues to operation 906 where scored first web content is received from a first source and scored second web content is received from a second source. The web content is scored based at least on the web content's relevance score to a first user account. The relevance may be determined based on preferences associated with the first user account, web browsing history associated with the first user account, location data associated with the first user account, as well as other features (e.g., geographic relevance, demographic relevance, trending relevance, topical relevance, temporal freshness, social graph relevance). In some examples, the relevance may be determined, based at least in part, on one or more categories associated with the web content. For example, web content may be categorized via application of natural language processing models, image neural networks, and/or analysis of webpage headers.

From operation 906 flow continues to operation 908 where a taskbar web content topical display category (e.g., sports, news, entertainment, weather) corresponding to the first web content is selected based on the first web content having a higher score than the second web content.

From operation 908 flow continues to operation 910 where a first web content element of the selected size and the topical display category is caused to be surfaced in the taskbar on the user interface.

From operation 910 flow moves to an end operation and the method 900 ends.

Figure 10:
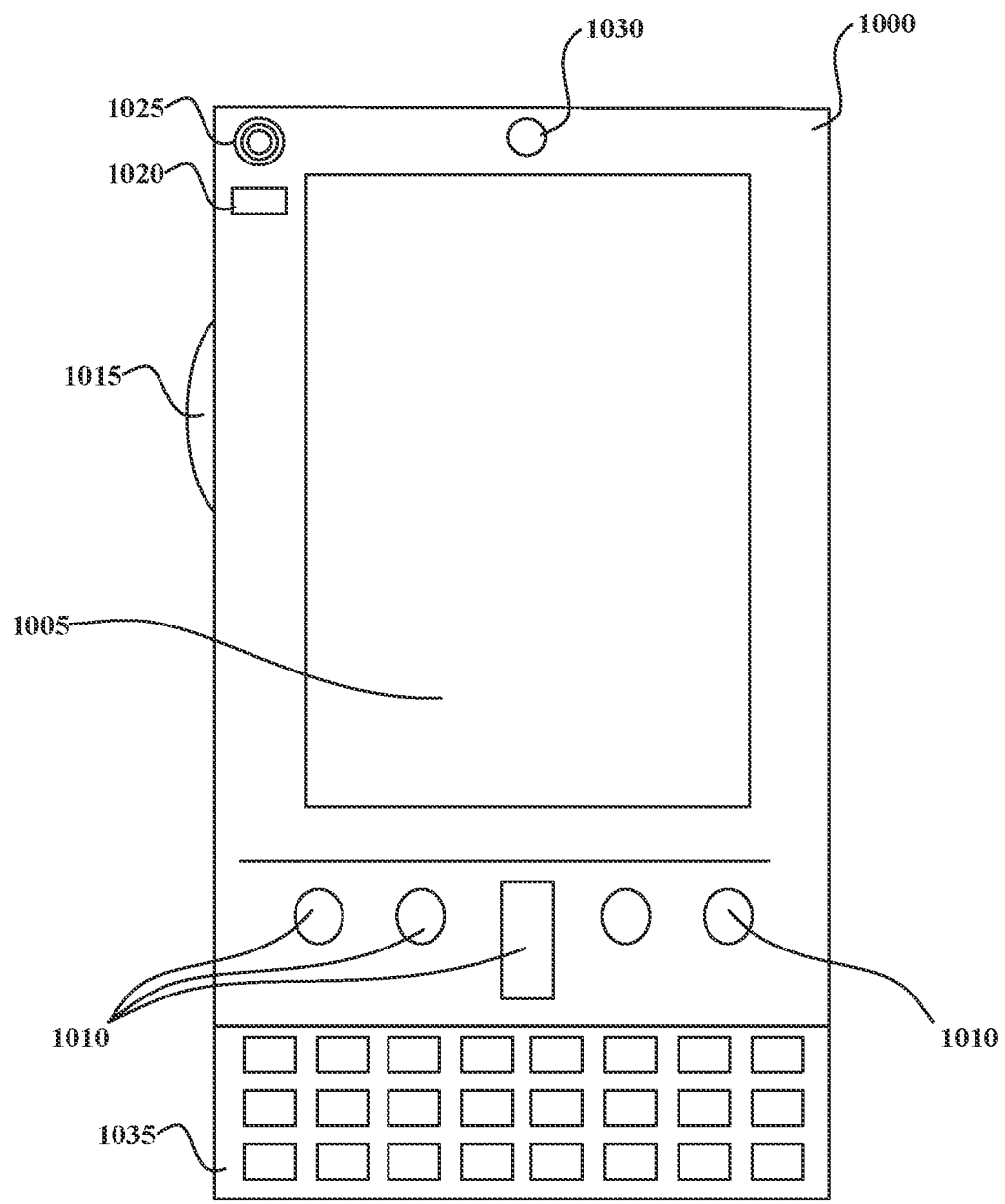
FIGS. 10 and 11 are simplified diagrams of a mobile computing device with which aspects of the disclosure may be practiced.
Figure 11:
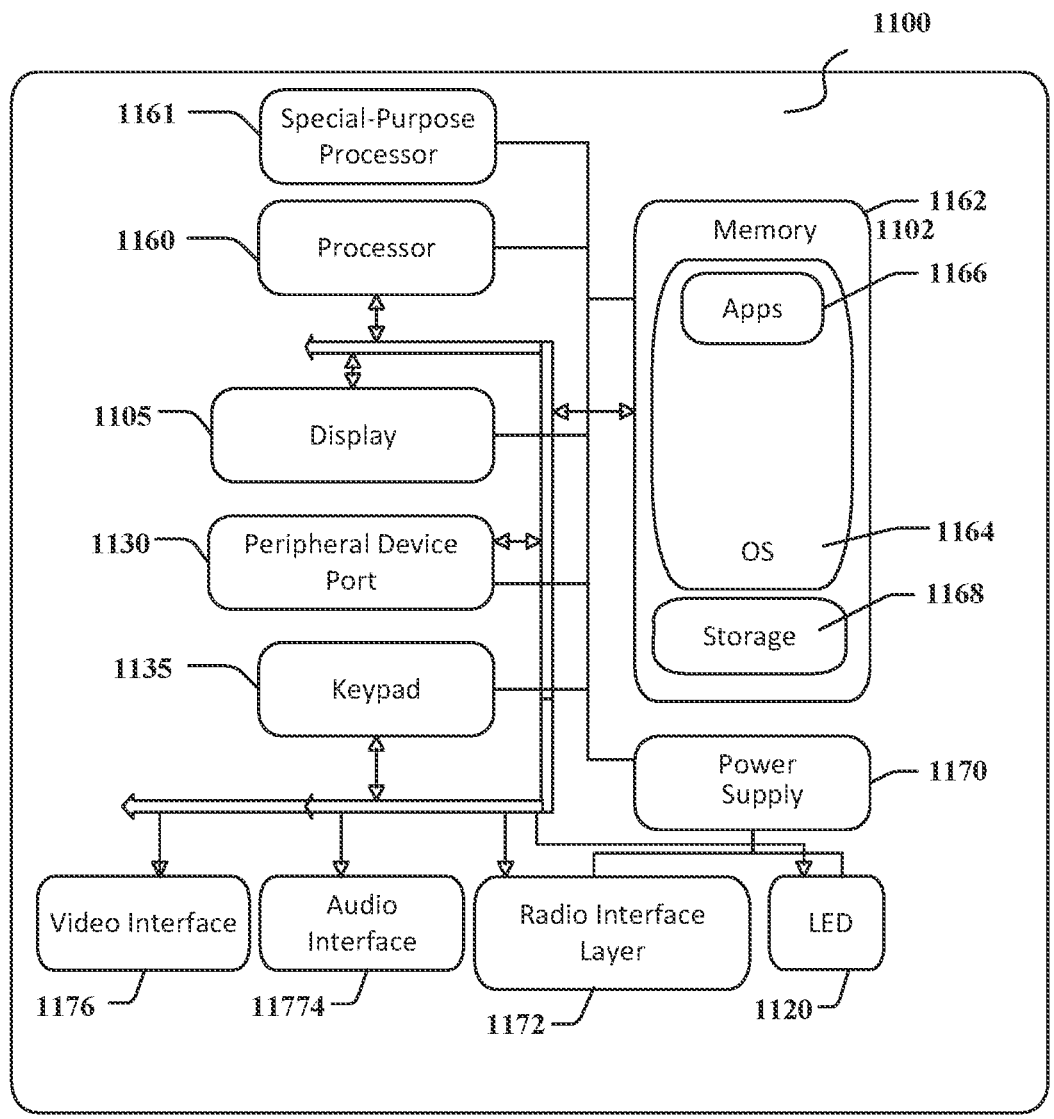

FIGS. 10 and 11 illustrate a mobile computing device 1000, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 10, one aspect of a mobile computing device 1000 for implementing the aspects described herein is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative aspects, mobile computing device 1000 may incorporate more or fewer input elements. For example, the display 1005 may not be a touch screen in some embodiments. In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 11 is a block diagram illustrating the architecture of one aspect of a mobile computing device. That is, the mobile computing device 1100 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100, including instructions for providing and operating a digital assistant computing platform.

The system 1102 has a power supply 1170, which may be implemented as one or more batteries. The power supply 1170 might further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 702 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1020 may be used to provide visual notifications, and/or an audio interface 1174 may be used for producing audible notifications via the audio transducer 1025. In the illustrated embodiment, the visual indicator 1020 is a light emitting diode (LED) and the audio transducer 1025 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1025, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of an on-board camera 1030 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11 by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

Figure 12:
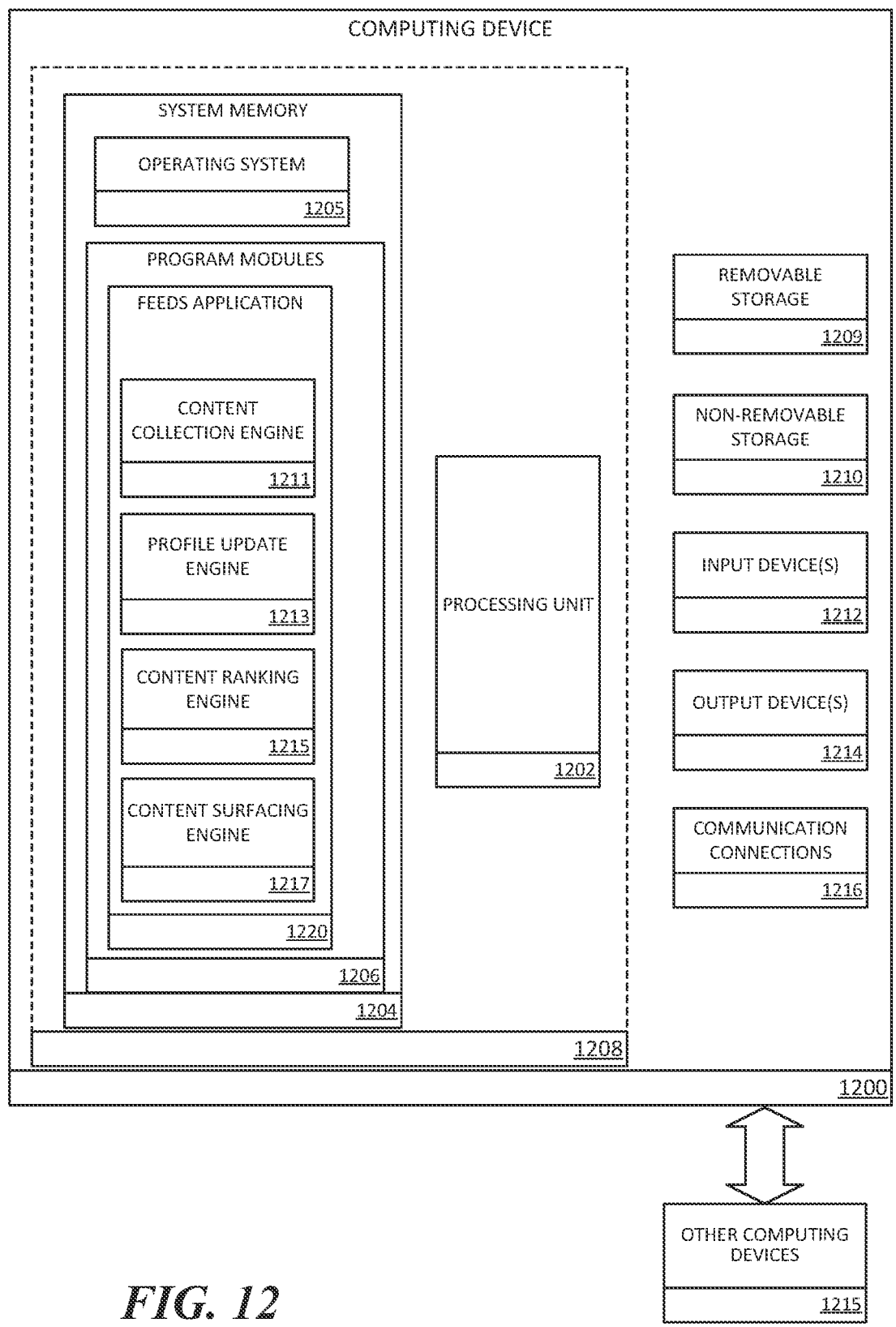
FIG. 12 is a block diagram illustrating example physical components of a computing device with which aspects of the disclosure may be practiced.

FIG. 12 is a block diagram illustrating physical components (e.g., hardware) of a computing device 1200 with which aspects of the disclosure may be practiced. The computing device components described below may have computer executable instructions for identifying and surfacing relevant web content in operating system shell surfaces. In a basic configuration, the computing device 1200 may include at least one processing unit 1202 and a system memory 1204. Depending on the configuration and type of computing device, the system memory 1204 may comprise, but is not limited to, volatile storage (e.g., random access memory), non-volatile storage (e.g., read-only memory), flash memory, or any combination of such memories. The system memory 1204 may include an operating system 1205 suitable for running one or more electronic calendar applications and productivity applications. The operating system 1205, for example, may be suitable for controlling the operation of the computing device 1200. Furthermore, embodiments of the disclosure may be practiced in conjunction with a graphics library, other operating systems, or any other application program and is not limited to any particular application or system. This basic configuration is illustrated in FIG. 12 by those components within a dashed line 1208. The computing device 1200 may have additional features or functionality. For example, the computing device 1200 may also include additional data storage devices (removable and/or non-removable) such as, for example, magnetic disks, optical disks, or tape. Such additional storage is illustrated in FIG. 12 by a removable storage device 1209 and a non-removable storage device 1210.

As stated above, a number of program modules and data files may be stored in the system memory 1204. While executing on the processing unit 1202, the program modules 1206 (e.g., feeds application 1220) may perform processes including, but not limited to, the aspects, as described herein. For example, feeds application 1220 may include content collection engine 1211, profile update engine 1213, content ranking engine 1215, and content surfacing engine 1217.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 12 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1200 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1200 may also have one or more input device(s) 1212 such as a keyboard, a mouse, a pen, a sound or voice input device, a touch or swipe input device, etc. The output device(s) 1214 such as a display, speakers, a printer, etc. may also be included. The aforementioned devices are examples and others may be used. The computing device 1200 may include one or more communication connections 1216 allowing communications with other computing devices 1250. Examples of suitable communication connections 1216 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1204, the removable storage device 1209, and the non-removable storage device 1210 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1200. Any such computer storage media may be part of the computing device 1200. Computer storage media does not include a carrier wave or other propagated or modulated data signal. Similarly, computer storage device does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 13:
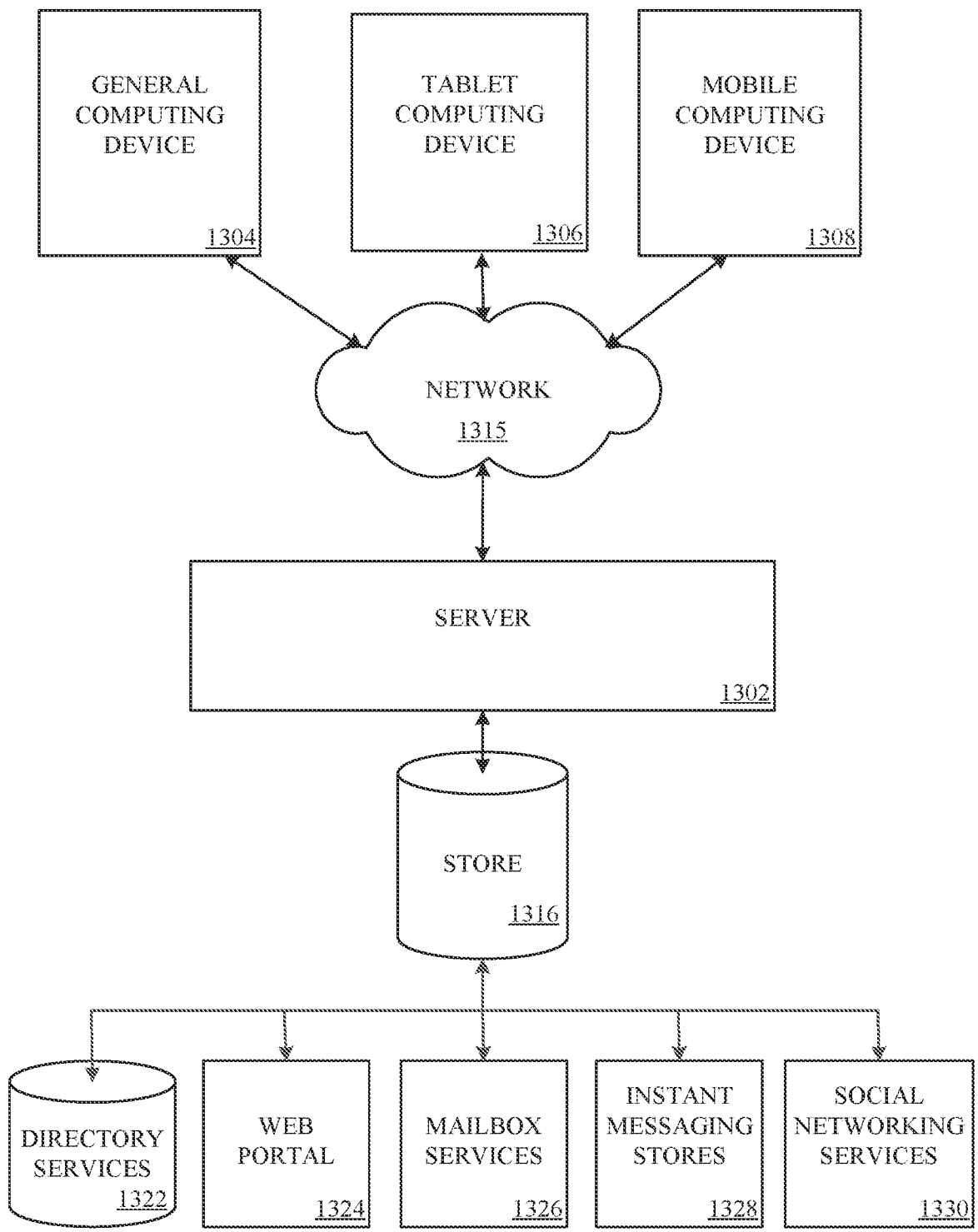
FIG. 13 is a simplified block diagram of a distributed computing system in which aspects of the present disclosure may be practiced.

FIG. 13 illustrates one aspect of the architecture of a system for processing data received at a computing system from a remote source, such as a personal/general computer 1304, tablet computing device 1306, or mobile computing device 1308, as described above. Content displayed at server device 1302 may be stored in different communication channels or other storage types. For example, various documents may be stored using a directory service 1322, a web portal 1324, a mailbox service 1326, an instant messaging store 1328, or a social networking site 1330. The program modules 1206 may be employed by a client that communicates with server device 1302, and/or the program modules 1206 may be employed by server device 1302. The server device 1302 may provide data to and from a client computing device such as a personal/general computer 1304, a tablet computing device 1306 and/or a mobile computing device 1308 (e.g., a smart phone) through a network 1315. By way of example, the computer systems described herein may be embodied in a personal/general computer 1304, a tablet computing device 1306 and/or a mobile computing device 1308 (e.g., a smart phone). Any of these embodiments of the computing devices may obtain content from the store 1316, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for surfacing web content in an operating system shell construct, the computer-implemented method comprising:
    determining an amount of free space in a taskbar on a user interface;
    selecting a taskbar web content element size based on the determined amount of free space in the taskbar, wherein the web content element size is selected from a first size having a first amount of information, and a second size having a second amount of information;
    receiving scored first web content from a first source and scored second web content from a second source, wherein the web content is scored based at least on the web content's relevance score to a first user account;
    selecting a taskbar web content topical display category corresponding to the first web content based on the first web content having a higher score than the second web content; and
    causing a first web content element of the selected size and the topical display category to be surfaced in the taskbar on the user interface.

2. The computer-implemented method of claim 1, further comprising:
receiving a selection of the surfaced first web content element; and
causing, based on receiving the selection, a subset of the first web content from the first source to be surfaced in a web content pane.

3. The computer-implemented method of claim 2, further comprising:
receiving a selection of the subset of the first web content in the web content pane; and
automatically causing a webpage corresponding to the first source to be opened and displayed in a web browser application.

4. The computer-implemented method of claim 1, further comprising:
periodically receiving web content from a web content feeds service;
caching the web content on a computing device on which the taskbar resides;
determining that an internet connection is currently unavailable;
determining that a content rotation temporal threshold has elapsed; and
causing a new web content element corresponding to web content cached on the computing device to be displayed in the taskbar on the user interface.

5. The computer-implemented method of claim 1, further comprising:
receiving scored third web content;
determining that the score for the third web content is above a threshold value; and
causing, based on the score for the third web content being above the threshold value, the first web content element to be replaced in the taskbar by a second web content element corresponding to the third web content.

6. The computer-implemented method of claim 5, further comprising:
selecting, based on the score for the third web content being above the threshold value, a different taskbar web content topical display category corresponding to the third web content.

7. The computer-implemented method of claim 6, wherein the second web content element has the selected size and the different topical taskbar web content topical display category.

8. The computer-implemented method of claim 1, further comprising:
calculating a score for the first web content, the calculating comprising:
determining a geographic relevance of the first web content to the first user account;
determining a demographic relevance of the first web content to the first user account;
determining a trending value of the first web content;
determining a temporal freshness value of the first web content;
determining a social graph value of the first web content in relation to the first user account; and
determining a topical match value of the first web content in relation to topical categories of interest for the first user account.

9. The computer-implemented method of claim 1, further comprising:
categorizing the first web content, the categorizing comprising applying an image neural network to a webpage corresponding to the first source, wherein the image neural network has been trained to classify web content into topical categories.

10. The computer-implemented method of claim 1, further comprising:
categorizing the first web content, the categorizing comprising applying a natural language processing model to text of a webpage corresponding to the first source, wherein the natural language processing model is an embedding model that has been trained to classify text into topical categories.

11. The computer-implemented method of claim 1, further comprising:
categorizing the first web content, the categorizing comprising analyzing a header of a webpage corresponding to the first source.

12. A system for surfacing web content in an operating system shell construct, comprising:
a memory for storing executable program code; and
a processor, functionally coupled to the memory, the processor being responsive to computer-executable instructions contained in the program code and operative to:
determine an amount of free space in a taskbar on a user interface;
select a taskbar web content element size based on the determined amount of free space in the taskbar, wherein the web content element size is selected from a first size having a first amount of information, and a second size having a second amount of information;
receive scored first web content from a first source and scored second web content from a second source, wherein the web content is scored based at least on the web content's relevance score to a first user account;
select a taskbar web content topical display category corresponding to the first web content based on the first web content having a higher score than the second web content; and
cause a first web content element of the selected size and the topical display category to be surfaced in the taskbar on the user interface.

13. The system of claim 12, wherein the processor is further responsive to the computer-executable instructions contained in the program code and operative to:
receive a selection of the surfaced first web content element; and
cause, based on receiving the selection, a subset of the first web content from the first source to be surfaced in a web content pane.

14. The system of claim 13, wherein the processor is further responsive to the computer-executable instructions contained in the program code and operative to:
receive a selection of the subset of the first web content in the web content pane; and
automatically cause a webpage corresponding to the first source to be opened and displayed in a web browser application.

15. The system of claim 12, wherein the processor is further responsive to the computer-executable instructions contained in the program code and operative to:
periodically receive web content from a web content feeds service;
cache the web content on a computing device on which the taskbar resides;

determine that an internet connection is currently unavailable;

determine that a content rotation temporal threshold has elapsed; and cause a new web content element corresponding to web content cached on the computing device to be displayed in the taskbar on the user interface.

16. The system of claim 12, wherein the processor is further responsive to the computer-executable instructions contained in the program code and operative to:

categorize the first web content, the categorizing comprising applying an image neural network to a webpage corresponding to the first source, wherein the image neural network has been trained to classify web content into topical categories.

17. The system of claim 12, wherein the processor is further responsive to the computer-executable instructions contained in the program code and operative to:

categorize the first web content, the categorizing comprising applying a natural language processing model to text of a webpage corresponding to the first source, wherein the natural language processing model is an embedding model that has been trained to classify text into topical categories.

18. A computer-readable storage device comprising executable instructions that, when executed by a processor, assist with surfacing web content in an operating system shell construct, the computer-readable storage device including instructions executable by the processor for:

determining an amount of free space in a taskbar on a user interface;

selecting a taskbar web content element size based on the determined amount of free space in the taskbar, wherein the web content element size is selected from a first size having a first amount of information, and a second size having a second amount of information;

receiving scored first web content from a first source and scored second web content from a second source, wherein the web content is scored based at least on the web content's relevance score to a first user account;

selecting a taskbar web content topical display category corresponding to the first web content based on the first web content having a higher score than the second web content; and causing a first web content element of the selected size and the topical display category to be surfaced in the taskbar on the user interface.

19. The computer-readable storage device of claim 18, wherein the instructions are further executable by the processor for:

receiving a selection of the surfaced first web content element; and causing, based on receiving the selection, a subset of the first web content from the first source to be surfaced in a web content pane.

20. The computer-readable storage device of claim 19, wherein the instructions are further executable by the processor for:

receiving a selection of the subset of the first web content in the web content pane; and automatically causing a webpage corresponding to the first source to be opened and displayed in a web browser application.

* * * * *